United States Patent
Zhang et al.

(10) Patent No.: US 10,328,371 B2
(45) Date of Patent: Jun. 25, 2019

(54) REFILLABLE AIR FILTER ASSEMBLY

(71) Applicant: 3M INNOVATIVE PROPERTIES COMPANY, St. Paul, MN (US)

(72) Inventors: Zhiqun Zhang, Roseville, MN (US); Andrew R. Fox, Oakdale, MN (US); Nicolas A. Echeverri, Woodbury, MN (US); Gary N. Eastlund, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 380 days.

(21) Appl. No.: 15/127,313

(22) PCT Filed: Mar. 20, 2015

(86) PCT No.: PCT/US2015/021756
§ 371 (c)(1),
(2) Date: Sep. 19, 2016

(87) PCT Pub. No.: WO2015/143326
PCT Pub. Date: Sep. 24, 2015

(65) Prior Publication Data
US 2017/0182445 A1    Jun. 29, 2017

Related U.S. Application Data

(60) Provisional application No. 62/038,738, filed on Aug. 18, 2014, provisional application No. 61/968,940, filed on Mar. 21, 2014.

(51) Int. Cl.
*B01D 46/00* (2006.01)
*B01D 46/10* (2006.01)
*B01D 46/52* (2006.01)

(52) U.S. Cl.
CPC ..... *B01D 46/0016* (2013.01); *B01D 46/0005* (2013.01); *B01D 46/008* (2013.01); *B01D 46/10* (2013.01); *B01D 46/521* (2013.01)

(58) Field of Classification Search
CPC ............ B01D 46/0005; B01D 46/0016; B01D 46/008; B01D 46/10; B01D 46/521
See application file for complete search history.

(56) References Cited

U.S. PATENT DOCUMENTS 2,057,568 A  * 10/1936 Gerard .................. B01D 46/10
                                                                    55/481
3,058,279 A  * 10/1962 Metcalfe ............... B01D 46/10
                                                                    160/378

(Continued)

FOREIGN PATENT DOCUMENTS

JP            2909732         6/1999
WO    WO 2001-34001        5/2001

OTHER PUBLICATIONS

International Search Report for PCT International Application No. PCT/US15/21756 dated Jul. 1, 2015, 3 pages.

*Primary Examiner* — Jason M Greene
(74) *Attorney, Agent, or Firm* — Kenneth B. Wood

(57) ABSTRACT

A frame assembly for releasably maintaining an air filter. In some embodiments, the frame assembly includes a thermoformed body integrally forming a base, opposing side walls, opposing end walls, and at least one closure sub-assembly. The frame assembly is configured to releasable retain an air filter relative to the base via the closure sub-assembly. In other embodiments, the frame assembly defines, in a flat state, foldable side and end panels at the perimeter edges of a central grid panel; the frame assembly can be transitioned to a final state for receiving an air filter by folding the panels.

(Continued)

The frame assemblies of the present disclosure are re-usable, allowing a user to replace a "used" air filter with a "new" air filter.

12 Claims, 16 Drawing Sheets

(56) References Cited

U.S. PATENT DOCUMENTS

| | | | |
|---|---|---|---|
| 4,439,219 A | | 3/1984 | Lambrecht |
| 4,667,661 A | | 5/1987 | Scholz |
| 4,737,174 A | * | 4/1988 | Pontius ................ B01D 46/12 |
| | | | 55/491 |
| 4,892,284 A | | 1/1990 | Kelrick |
| 5,273,564 A | | 12/1993 | Hill |
| 5,486,410 A | | 1/1996 | Groeger |
| 5,501,794 A | * | 3/1996 | Van de Graaf .... B01D 46/0005 |
| | | | 210/493.3 |
| 5,505,852 A | | 4/1996 | Van Rossen |
| 5,540,652 A | | 7/1996 | Callinan |
| 5,571,300 A | * | 11/1996 | Stemmer ................ B01D 46/10 |
| | | | 55/493 |
| 5,597,645 A | | 1/1997 | Pike |
| 5,662,728 A | | 9/1997 | Groeger |
| 5,672,402 A | | 9/1997 | Kreckel |
| 5,695,147 A | | 12/1997 | Zimmerman |
| 5,972,808 A | | 10/1999 | Groeger |
| 6,001,471 A | | 12/1999 | Bries |
| 6,033,453 A | * | 3/2000 | Weddell, III ...... B01D 46/0005 |
| | | | 55/493 |
| 6,057,256 A | | 5/2000 | Krueger |
| 6,059,852 A | | 5/2000 | Olson |
| 6,403,206 B1 | | 6/2002 | Bries |
| 6,464,745 B2 | | 10/2002 | Rivera |
| 6,569,521 B1 | | 5/2003 | Sheridan |
| 6,572,067 B1 | | 6/2003 | Kamenstein |
| 6,666,425 B1 | | 12/2003 | Ferguson |
| 6,740,137 B2 | | 5/2004 | Kubokawa |
| 6,858,297 B1 | | 2/2005 | Shah |
| 6,918,940 B1 | * | 7/2005 | Lackey ............... B01D 46/0005 |
| | | | 55/385.1 |
| 7,037,354 B1 | | 5/2006 | Dimicelli |
| 7,078,093 B2 | | 7/2006 | Sheridan |
| 7,169,202 B2 | | 1/2007 | Kubokawa |
| 7,622,063 B2 | | 11/2009 | Sundet |
| 7,695,660 B2 | | 4/2010 | Berrigan |
| 7,781,056 B2 | | 8/2010 | Bries |
| 7,858,163 B2 | | 12/2010 | Angadjivand |
| 7,947,142 B2 | | 5/2011 | Fox |
| 8,061,054 B2 | | 11/2011 | Rabin |
| 8,162,153 B2 | | 4/2012 | Fox |
| 8,828,111 B2 | | 9/2014 | Aycock |
| 2003/0230063 A1 | * | 12/2003 | Kubokawa ......... B01D 46/0005 |
| | | | 55/497 |
| 2004/0182055 A1 | | 9/2004 | Wynn |
| 2005/0217226 A1 | | 10/2005 | Sundet |
| 2007/0289271 A1 | * | 12/2007 | Justice ............... B01D 46/0002 |
| | | | 55/495 |
| 2009/0183474 A1 | * | 7/2009 | Workman .......... B01D 46/0005 |
| | | | 55/385.2 |
| 2009/0301044 A1 | * | 12/2009 | Miller ................ B01D 46/0001 |
| | | | 55/475 |
| 2011/0138760 A1 | | 6/2011 | Sundet |
| 2012/0112022 A1 | | 5/2012 | Cheng |
| 2012/0317944 A1 | | 12/2012 | Lise |
| 2013/0091818 A1 | | 4/2013 | Anoszko |
| 2013/0327004 A1 | | 12/2013 | Lise |

* cited by examiner

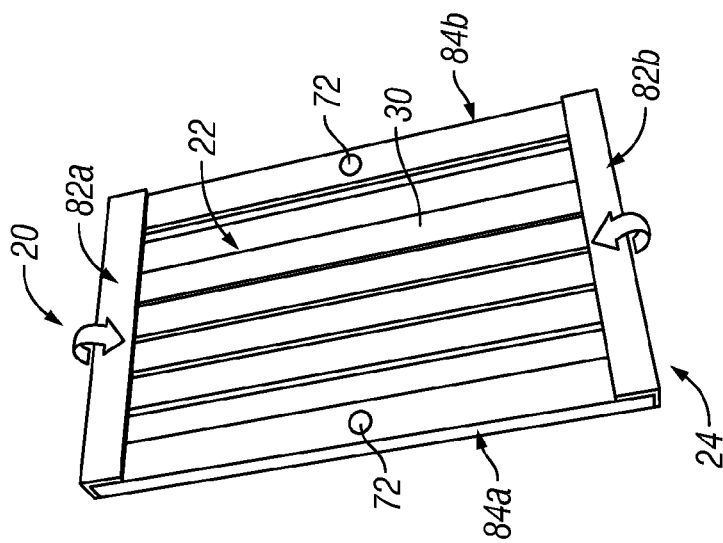
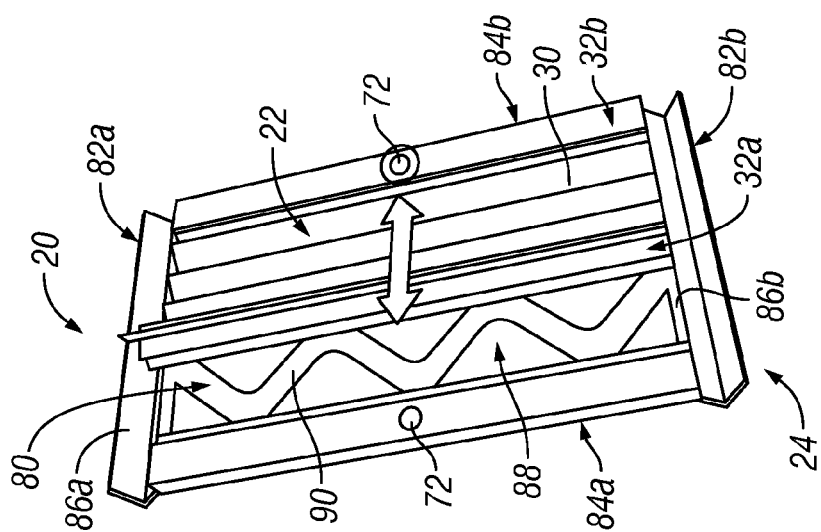
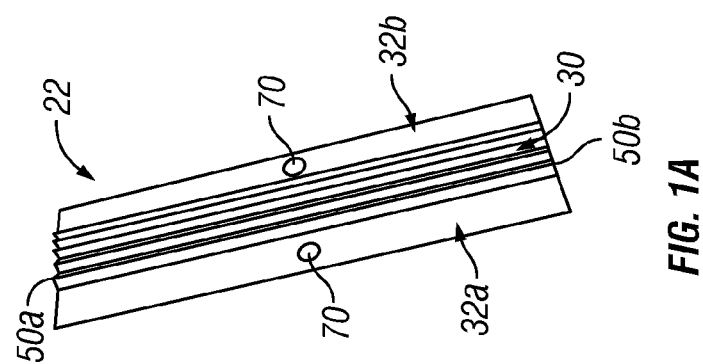

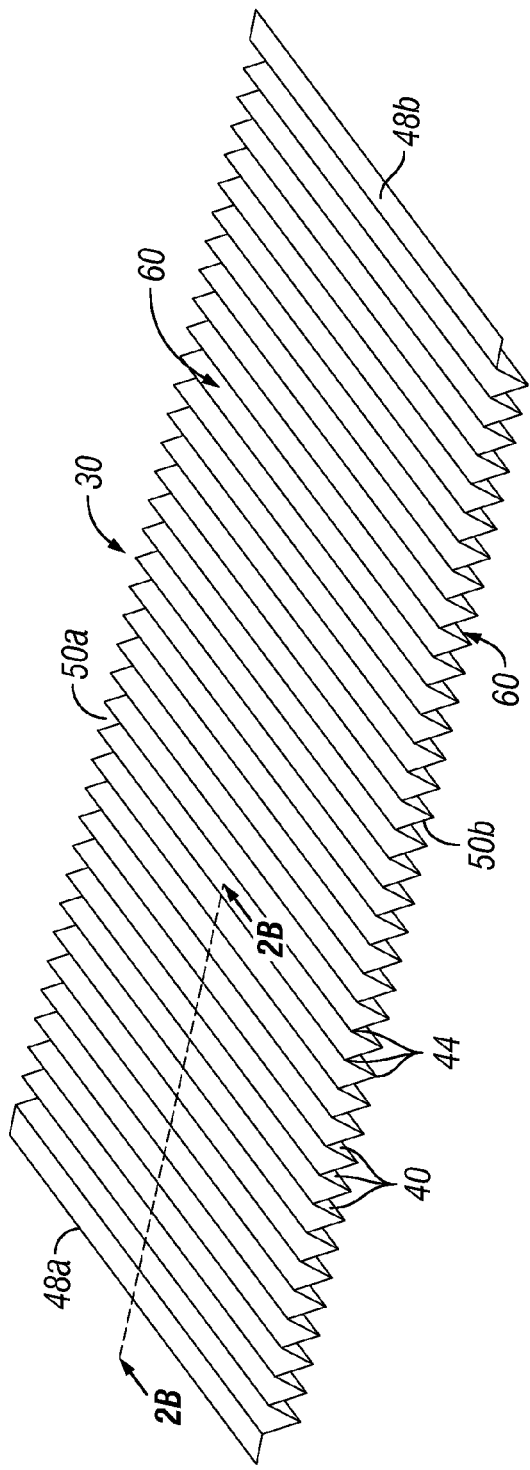
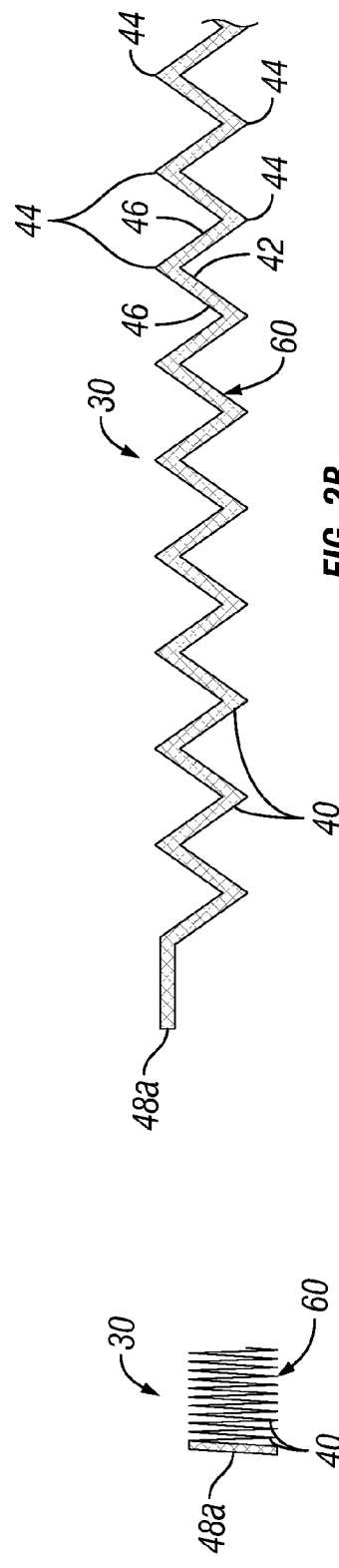
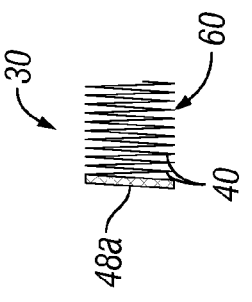
FIG. 2A
FIG. 2B
FIG. 2C

REFILLABLE AIR FILTER ASSEMBLY

TECHNICAL FIELD

The present disclosure relates to air filters. More particularly, it relates to air filter systems with separable outer frame and filter media components.

BACKGROUND

Disposable air filters are commonly used in forced air systems (e.g., residential heating and air-conditioning systems often referred to as "HVAC" systems) to remove particulate matter (e.g., dust and dirt particles). Air filters typically include a filter media surrounded and supported by a frame. Additional supporting and/or reinforcing components, such as a mesh screen and/or adhesive beads, may also be included. After a period of use, the filter media becomes dirty or clogged, and must be replaced. This is accomplished by replacing the entire air filter system. Even though only the filter media portion of the air filter system is no longer functional, the entire air filter system is discarded, resulting in waste.

In addition to supporting the filter media, the frame defines a perimeter size and shape of the air filter, and is normally selected to match the size and shape of the expected end-use application. For example, many residential HVAC systems are configured for use with a "standard" sized air filter of 20"×20"×1" or 20"×25"×1". The rigid frame dictates that the air filter has this rather large size when shipped to a retailer, when presented to potential purchasers, and when stored by an end user. Consequently, these air filters undesirably occupy a relative large volume of space on transportation vehicles, on retailer shelves, and in end user's homes.

SUMMARY

The inventors of the present disclosure recognized the benefits of having a collapsible and/or extendible air filter assembly that overcomes one or more of the above-mentioned problems associated with conventional, disposable air filters. Some air filter assembly embodiments of the present disclosure include reusable portions such that only a portion of the entire air filter system needs to be disposed of after use. For example, in some embodiments, only the filter media is disposed of after a single use. Some air filter assembly embodiments of the present disclosure have a significantly decreased size during at least one of transport, sale, and/or storage. For example, in some embodiments, the air filter system (or portions thereof) is folded into less than ½ of its original size.

Some embodiment relate to a frame assembly for releasably maintaining air filter media, the frame assembly comprising: a body integrally forming a base, opposing side walls, opposing end walls, and at least one closure sub-assembly; wherein the frame assembly is configured to releasably retain the air filter media relative to the base via the closure sub-assembly.

Some embodiments relate to a frame assembly for releasably maintaining air filter media, the frame assembly transitionable from a flat state to a final state, wherein the frame assembly, in the flat state, comprises: a grid panel having first-fourth edges; first and second end panels foldably connected to the first and third edges, respectively, wherein the first and second end panels each include at least one fold line creating first and second end flaps; first and second side panels foldably connected to the second and fourth edges, respectively, wherein the first and second side panels each include fold lines creating first-fourth side flaps; at least one closure sub-assembly formed or carried by at least one of the end flaps and one of the side flaps; and an air filter connection device formed or carried by at least one of the end flaps or one of the side flaps.

In some embodiments, the frame assembly further includes a support flange extending from each of the opposing side walls. Some embodiments further include one or more capture arms extending from each of the end walls. In some embodiments, at least one of the capture arms is pivotable relative to the corresponding end wall. Some embodiments further include a living hinge interconnecting at least one of the capture arms to the corresponding end wall. In some embodiments, the closure sub-assembly includes a first component carried by a first support flange and a second component carried by a first capture arm, and further wherein the first and second components have a complimentary construction such that the first and second components can be releasably connected. In some embodiments, the first component is a receptor and the second component is a button. In some embodiments, the frame assembly is configured to nestably receive a second, identically shaped frame assembly. In some embodiments, the body is thermoformed. In some embodiments, the closure sub-assembly includes a tab formed by one of the end flaps and a complimentary insertion slot formed in one of the side flaps. In some embodiments, the closure sub-assembly includes a fastening material strip carried by one of the end flaps and a complimentary fastening material strip carried by one of the side flaps.

BRIEF DESCRIPTION OF THE DRAWINGS

FIG. 1A is a perspective view of an air filter useful with air filter systems in accordance with principles of the present disclosure and arranged in a collapsed state;

FIG. 1B is a perspective view of an air filter system in accordance with principles of the present disclosure and including the air filter of FIG. 1A in a partially expanded state arranged within a frame assembly;

FIG. 1C is a perspective view of the system of FIG. 1B, including the air filter secured within the frame assembly;

FIG. 2A is a perspective view a pleated filter media assembly useful with air filters of the present disclosure and in an expanded condition;

FIG. 2B is a cross-sectional view of the pleated filter media assembly of FIG. 2A, taken along the line 2B-2B;

FIG. 2C is a side view of a portion of the pleated filter media assembly of FIG. 2A in a collapsed condition;

Figure 3:
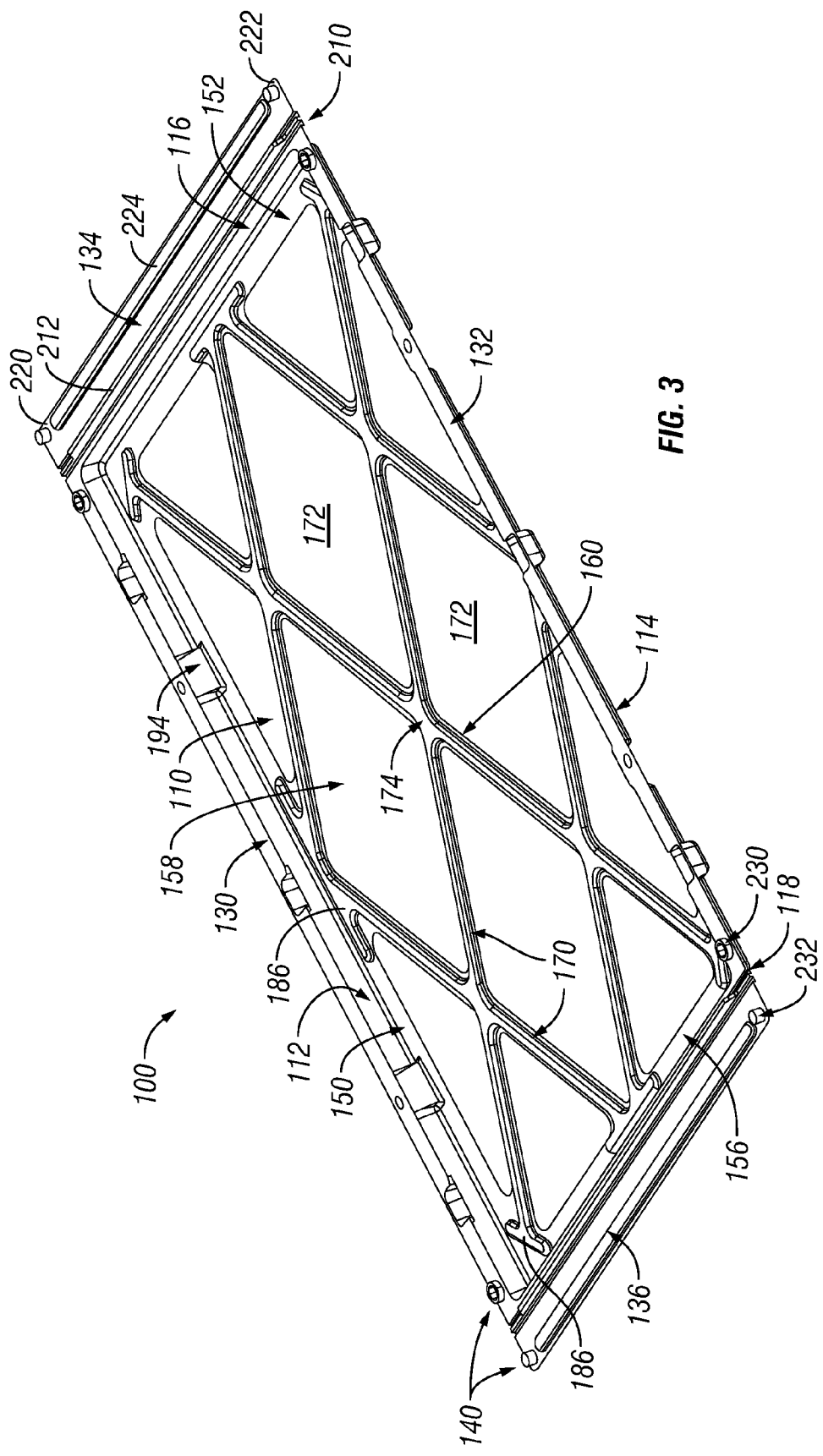
FIG. 3 is a perspective view of a frame assembly useful with air filter systems in accordance with principles of the present disclosure.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

DETAILED DESCRIPTION

The present disclosure will be described more fully hereinafter with reference to the accompanying drawings, in which exemplary embodiments are shown. The scope of this disclosure, however, may be embodied in many different forms and should not be construed as limited to the embodiments set forth or shown herein.

Aspects of the present disclosure relate to air filter systems including an air filter removably attached or assembled to a frame. The air filter and the frame incorporate complimentary mounting features that promote removable installation of the air filter to the frame, and the frame includes or carries various components that actively capture the air filter once installed. As described below, the complimentary mounting features can assume various forms, as can the capture components. In more general terms, one embodiment of an air filter system 20 in accordance with principles of the present disclosure is shown in FIGS. 1A-1C. The air filter system 20 includes an air filter 22 and a frame assembly 24. The air filter 22 includes a filter media assembly 30, and is configured to be selectively received and removed from the frame assembly 24; in other words, the air filter 22 is replaceable. The frame assembly 24 is sized for insertion into a conventional HVAC system and supporting the filter media assembly 30 in the presence of HVAC system airflow. When the filter media assembly 30 becomes dirty or clogged, the used air filter 22 is readily removed from the frame assembly 24 and replaced with a new air filter 22. In some embodiments, the filter media assembly 30 has a pleated construction, configured to readily transition between collapsed and expanded states. With these optional constructions, a removable wrapper or other packaging can be provided to retain the air filter 22 in the collapsed state prior to use to save space with shipping and display.

The air filter 22 includes the filter media assembly 30 and optional, opposing end members 32a, 32b. The filter media assembly 30 can assume a wide variety of forms useful for HVAC air filtration presently known, or in the future developed. In some embodiments, the filter media assembly 30 is a pleated filter media assembly. By "pleated" is meant a web at least a portion of which has been folded to form a configuration comprising rows of generally parallel, oppositely oriented folds. For example, and as shown in FIGS. 2A and 2B, a pleated version of the filter media assembly 30 includes a plurality of pleats 40 each including a fold line 42 defining a pleat tip 44 and a pair of adjacent panels 46. Materials and construction of the optional pleated version of the filter media assembly 30 are such that the pleated filter media assembly 30 can, in some embodiments, be repeatedly transitioned between an expanded condition as in FIG. 2B and a collapsed condition as in FIG. 2C, with a spacing distance between successive pleat tips 44 in the expanded condition being greater than that of the collapsed condition. As a point of reference, the "expanded condition" of the pleated version of the filter media assembly 30 as an individual component generally corresponds with the "expanded state" of the air filter 22 (FIG. 1C) as a whole (and the "collapsed condition" of the pleated version of the filter media assembly 30 generally corresponds with the "collapsed state" of the air filter 22 (FIG. 1A)), except that the frame assembly 24 (FIGS. 1B and 1C) includes additional components (described below) that retain the filter media assembly 30 in the particular size and shape of the expanded state. In other words, while the pleated version of the filter media assembly 30 can be transitioned (e.g., stretched or compacted) to any of a number of different "expanded conditions" and "collapsed conditions", the pleated version of the filter media assembly 30 cannot, in and of itself, self-retain the shape of any one particular condition. The air filter 22, however, as whole can self-retain the shape of the selected expanded state when installed to the frame assembly 24. The pleated version of the filter media assembly 30 can have the rectangular shape (that is specifically inclusive of a square shape) shown, defining opposing ends 48a, 48b and opposing sides 50a, 50b.

The pleated version of the filter media assembly 30 can consist of a pleated filter media or web 60 alone (as in the illustrated embodiment), or can include one or more additional components or structures applied or assembled to a pleated filter media 60 so long as the resultant pleated filter media assembly 30 can at least be transitioned from the collapsed condition to the expanded condition without damaging a structural integrity of the pleated filter media assembly 30, and optionally can be repeatedly transitioned between the collapsed and expanded conditions without damaging a structural integrity of the pleated filter media assembly 30. The pleated filter media 60 of the assembly 30 can be self-supporting or non-self-supporting. For example, where the pleated version of the filter media assembly 30 consists of the pleated filter media 60 alone, the pleated filter media or web 60 can be self-supporting or non-self-supporting. Where the pleated version of the filter media assembly 30 consists of the pleated filter media or web 60 and a support structure, the pleated filter media 60 can be non-self-supporting with the addition supporting structure rendering the pleated filter media assembly 30, as a whole, to be self-supporting. A "self-supporting pleated filter media or web" can describe a pleated filter media or web that is deformation resistant without requiring stiffening layers, adhesive or other reinforcement in the filter media web. Alternatively, "self-supporting" means that the pleated filter media generally maintains its shape when subjected to an airstream as described, for example, in U.S. Pat. No. 7,169,202 to Kubokawa, the entire teachings of which are incorporated herein by reference. Alternatively, the term "self-supporting" refers to a web or media having sufficient coherency and strength so as to be drapable and handleable without substantial tearing or rupture, and when used with respect to a pleated filter, refers to a filter whose pleats have sufficient stiffness so that they do not collapse or bow excessively when subjected to the air pressure typically encountered in forced air ventilation systems. The term "non-self-supporting" can denote an air filter media that is not capable, in the absence of a support frame and/or a support grill, of withstanding the forces encountered due to forced air flow in a typical residential HVAC system when placed in a conventional holding fixture of the typical residential HVAC system.

The particular filter media 60 selected for the pleated version of the filter media assembly 30 is not critical to the present disclosure so long as the resultant pleated filter media assembly 30 (whether consisting solely of the pleated filter media 60 alone or with additional structures applied thereto) has the desired characteristics described herein. The filter media 60 can be constructed, for example, from nonwoven fibrous media formed of thermoplastics or thermosetting materials such as polypropylene, linear polyethylene and polyvinyl chloride. Other suitable, non-limiting materials for the filter media include porous foams, nonwovens, papers, fiberglass, or the like. The filter media assembly 30 can optionally include a highly open wire mesh or screen, one or more adhesive strands, etc., is bonded to the filter media 60 in order to enhance the pleatability thereof and that is pleated along with the filter media 60 itself. The wire mesh or screen (or other additional component) may impede re-collapsing of the pleated version of the filter media assembly 30 from the expanded condition. In other embodiments, the pleated version of the filter media assembly 30 can incorporate wire-supported pleats, self-supported mini-pleats, or other pleat constructions currently available or in the future developed.

In some embodiments, the filter media 60 comprises a nonwoven web that can have random fiber arrangement and generally isotropic in-plane physical properties (e.g., tensile strength), or if desired may have aligned fiber construction (e.g., one in which the fibers are aligned in the machine direction as described in U.S. Pat. No. 6,858,297 to Shah et al., the teachings of which are incorporated herein by reference) and anisotropic in-plane physical properties. Some or all of the fibers comprising the nonwoven webs useful with the filter media 60 can be multicomponent fibers having at least a first region and a second region, where the first region has a melting temperature lower than the second region. Some suitable multicomponent fibers are described, for example, in U.S. Pat. Nos. 7,695,660, 6,057,256, 5,597,645, 5,972,808, 5,662,728 and 5,486,410 the teachings of each of which are incorporated herein by reference in their entireties.

Other nonwoven webs useful with the filter media 60 can be a high loft spunbond web, such as described, for example, in U.S. Pat. No. 8,162,153 to Fox et al., the entire teachings of which are incorporated herein by reference. In other embodiments, the filter media 60 can be a low loft spunbond web, such as those described in U.S. Pat. No. 7,947,142 to Fox et al., the entire teachings of which are incorporated herein by reference. In yet other embodiments, nonwoven webs useful with the filter media 60 are generated by other techniques and/or have other characteristics, such as the meltblown nonwoven webs disclosed in U.S. Pat. No. 6,858,297 to Shah et al. (mentioned above). Other non-limiting example of useful nonwoven web formats include bi-modal fiber diameter meltblown media such as that described in U.S. Pat. No. 7,858,163, the entire teaching of which are incorporated herein by reference.

In some embodiments, an electrostatic charge is optionally imparted into or on to material(s) of the filter media 60. Thus, the filter media 60 can be an electret nonwoven web. Electric charge can be imparted to the filter media 60 in a variety of ways as is well known in the art, for example by hydrocharging, corona charging, etc. (e.g., as described in U.S. Pat. No. 7,947,142 (mentioned above)). In other embodiments, the filter media 60 is not electrostatically charged.

The optional pleats can be formed in the filter media 60 (or in the pleated filter media assembly 30) using various methods and components as are well known in the art, e.g., to form a pleated filter for use in applications such as air filtration, for example those described in U.S. Pat. No. 6,740,137 to Kubokawa et al. and U.S. Pat. No. 7,622,063 to Sundet et al., the entire teachings of both of which are incorporated herein by reference.

In other embodiments of the present disclosure, the filter media assembly 30 need not have a pleated construction. The filter media associated with the flat version of the filter media assembly can be formed of any of the materials described above, and is formatted to maintain a pre-scribed size and shape. The frame assemblies of the present disclosure are equally useful with pleated-type air filters and flat-type air filters.

Returning to FIGS. 1A-1C, the end members 32a, 32b, where provided, are each generally configured for mounting to a corresponding one of the ends 48a, 48b (best seen in FIG. 2A), respectively, of the filter media assembly 30, and in some embodiments can be identical or substantially identical. The end members 32a, 32b serve as reinforcements or handles, promoting user grasping and manipulation of the air filter 22, covering of the ends 48a, 48b of the filter media assembly 30, and a more rigid structure for insertion into, and retention within, the frame assembly 24. In some embodiments, the end members 32a, 32b are constructed of a material commonly used for HVAC filter frames, such as paper, paperboard, plastic, metal, etc. The end members 32a, 32b can each have a length that substantially corresponds with a dimension of the corresponding filter assembly end 48a, 48b, although other dimensional relationships are envisioned. While each of the end members 32a, 32b may encompass a small portion of each of the opposing sides 50a, 50b of the filter media assembly 30, presence of the end members 32a, 32b does not overtly restrict collapsing or stretching of the filter media assembly 30 (when the filter media assembly 30 has the optional pleated construction). For example, at least a majority, and in some embodiments at least 70%, 80%, 90% or at least 95%, of a length of the opposing sides 50a, 50b are unencumbered by the end members 32a, 32b, allowing the filter media assembly 30 to optionally be condensed into a compact format in the collapsed state (e.g., at least a majority of the pleats 40 (FIG. 2B) of the pleated version of the filter media assembly 30 are free of the end frame members 32, 34). The end members 32a, 32b can be attached to the filter media assembly 30 in various manners as known in the art and appropriate for the materials employed. For example, in some embodiments, the end members 32a, 32b are adhesively bonded over a corresponding one of the ends 48a, 48b of the pleated filter media assembly 30.

In some embodiments, the end members 32a, 32b incorporate various features configured in accordance with complimentary mounting features of the frame assembly 24 to facilitate mounting of the air filter 22 to the frame assembly 24. For example, each of the end members 32a, 32b can form a hole 70 sized to receive a corresponding peg 72 or similar structure provided with the frame assembly 24. Alternatively the hole(s) 70 can be formed in the frame assembly 24 and the peg(s) 72 carried by the end members 32a, 32b. A wide variety of other mounting configurations or mechanisms are equally acceptable as would be apparent to one of ordinary skill.

The frame assembly 24 can assume a wide variety of forms, and is generally configured to maintain its structural integrity over extended periods of use. In some embodiments, the frame assemblies of the present disclosure are at least primarily comprised of a relatively rigid yet relatively inexpensive material such as plastic (e.g., thermoformed plastic). Other inexpensive materials such as paperboard or cardboard (e.g., akin to the materials used with conventional HVAC air filter frames, although optionally in a thicker caliper) are also envisioned. Alternatively, other materials such as metal can be employed. In some embodiments, the frame assembly 24 includes a base 80 and opposing side walls 82a, 82b. The base 80 carries or forms opposing end frame segments 84a, 84b and opposing side frame segments 86a, 86b. A central region 88 of the base 80 is generally open (although one or more support struts or ribs 90 optionally extend across the central region 88). Regardless, the end frame segments 84a, 84b include or carry one or more structures configured for mounting to the air filter 22 (e.g., the pegs 72). Each of the opposing side walls 82a, 82b is pivotably connected to a corresponding one of the side frame segments 86a, 86b, such that the opposing side walls 82a, 82b can be manipulated between the open arrangement of FIG. 1B and the closed arrangement of FIG. 1C. In the open arrangement, the side walls 82a, 82b are displaced from the central region 88, whereas in the closed arrangement, the side walls 82a, 82b project partially across the central region 88. With this construction, the air filter 22 can be placed in, and removed from, the central region 88 when the side walls 82a, 82b are in the open arrangement. Conversely, the side walls 82a, 82b secure the air filter 22 within the central region 88 in the closed arrangement. In this regard, the frame assembly 24 can include or incorporate various locking features or mechanisms (not shown) that retain the side walls 82a, 82b in the closed arrangement as will be apparent to one of ordinary skill. For example, hook-and-loop, magnets, notches/tabs, etc., can be included that promote non-permanent securement of the side walls 82a, 82b in the closed arrangement.

In some embodiments, the frame assembly 24 is configured to be nestable with another, similarly constructed frame assembly 24. For example, the side walls 82a, 82b and optionally the end frame segments 84a, 84b can have a tapered shape in the depth direction such that a second frame assembly 24 can at least partially nest "inside" the central region 88 of the first frame assembly 24. The frame assembly 24 can be configured to provide this optional nesting feature with side walls 82a, 82b in the open arrangement, the closed arrangement, or both. In yet other embodiments, the frame assemblies of the present disclosure can be formatted and constructed of a material that can be completely knocked down flat for retail sale. For example, the end frame segments 84a, 84b can be unfurled and attached by the end user (e.g., adhesively attached by an adhesive strip). With at least some of these embodiments, the user can construct or arrange the frame assembly 24 to the state shown (appropriate for receiving and retaining the air filter 22) by hand and without requiring specialized tools or tooling. In other embodiments, the frame assembly 24 is not specifically configured to provide for frame assembly-to-frame assembly nesting or stacking.

With optional embodiments in which the air filter 22 is collapsible, the air filter 22 is initially arranged in the collapsed state (FIG. 1A) in which the filter media assembly 30 is condensed (and held) into a compact media pack. The air filter 22 can be shipped to a retailer, stored at the retailer's place of business, displayed on the retailer's shelves, transported by a purchaser/user, and/or temporarily stored by the user in the collapsed state. At each of the stages, the air filter 22 (in the collapsed state) beneficially occupies a significantly reduced volume (as compared to the expanded state), thereby reducing associated costs and increasing user satisfaction. In some embodiments, the air filter 22 can include additional components (e.g., outer packaging such as shrink wrap plastic) that "holds" the filter media assembly 30 to the collapsed state (preventing the pleated version of the filter media assembly 30 from self-expanding).

When the user is ready to install the air filter 22 to an HVAC system, the user simply pulls on the two end frame members 32a, 32b to stretch the pleated version of the filter media assembly 30 to a size corresponding with a size of the frame assembly 24. In this regard, one end of the air filter 22 can be mounted to the frame assembly 24 (with the side walls 82a, 82b in the open arrangement) as described above to assist in stretching the pleated version of the filter media assembly 30. Regardless, once the air filter 22 approximates to a size of the frame assembly 24, the end members 32a, 32b are secured to the frame assembly 24, and the side walls 82a, 82b are articulated to the closed arrangement (FIG. 1C) to lock the air filter 22 in place. The assembled filter system 20 is then installed to the filter receiving housing or bay of the HVAC system. The air filter 22 filters contaminants from the HVAC system's airflow. When replacement of the air filter 22 is desired, the air filter system 20 is removed from the HVAC system, the side walls 82a, 82b rotated to the open arrangement, and the used air filter 22 removed. A new air filter 22 is installed to the frame assembly 24, and the "new" air filter system 20 re-installed to the HVAC system. Unlike conventional HVAC air filters, only the air filter 22 is disposed of, and the frame assembly 24 is re-used thus reducing overall costs and waste.

Another embodiment of a frame assembly 100 in accordance with principles of the present disclosure (and useful as part of refillable air filter system of the present disclosure) is shown in FIG. 3. The frame assembly 100 can be formed or provided as an integral, homogenous body, and in some embodiments is a thermoformed plastic structure (e.g., high impact polystyrene, polypropylene, etc.). Other manufacturing techniques (e.g., injection molding) are also envisioned, as are other materials (e.g., paper-based). With thermoformed plastic embodiments, however, the frame assembly 100 can have a relatively thin wall construction and optionally incorporates one more features conducive to thermoforming and adapted to enhance a structural rigidity of the frame assembly 100 as described below.

In general terms, the frame assembly 100 includes or defines a base 110. Opposing, first and second side walls 112, 114 and opposing, first and second end walls 116, 118, project from the base 110. First and second support flanges 130, 132 are connected to and extend from a corresponding one of the side walls 112, 114, respectively, opposite the base 110. First and capture arms 134, 136 extend from (or are connected to) a corresponding one of the end walls 116, 118, respectively, opposite the base 110. The frame assembly 100 is constructed such that the capture arms 134, 136 can pivot relative to the corresponding end wall 116, 118, and thus can readily be transitioned between an open arrangement of the frame assembly 100 as reflected in FIG. 3 (in which the capture arms 134, 136 extend away or are spaced from the support flanges 130, 132) and a closed arrangement (not shown) in which the capture arms 134, 136 extend over a portion of the support flanges 130, 132. In this regard, the frame assembly 100 includes or provides complimentary closure sub-assemblies (referenced generally at 140 in FIG. 3) configured to releasably secure the capture arms 134, 136 to the support flanges 130, 132 in the closed arrangement as described in greater detail below. The closure sub-assemblies 140 can further be configured to retain the air filter (not shown, but akin to the air filter 22 of FIG. 1A as described above). The frame assembly 100 can optionally incorporate additional reinforcement or support features.

Figure 4:
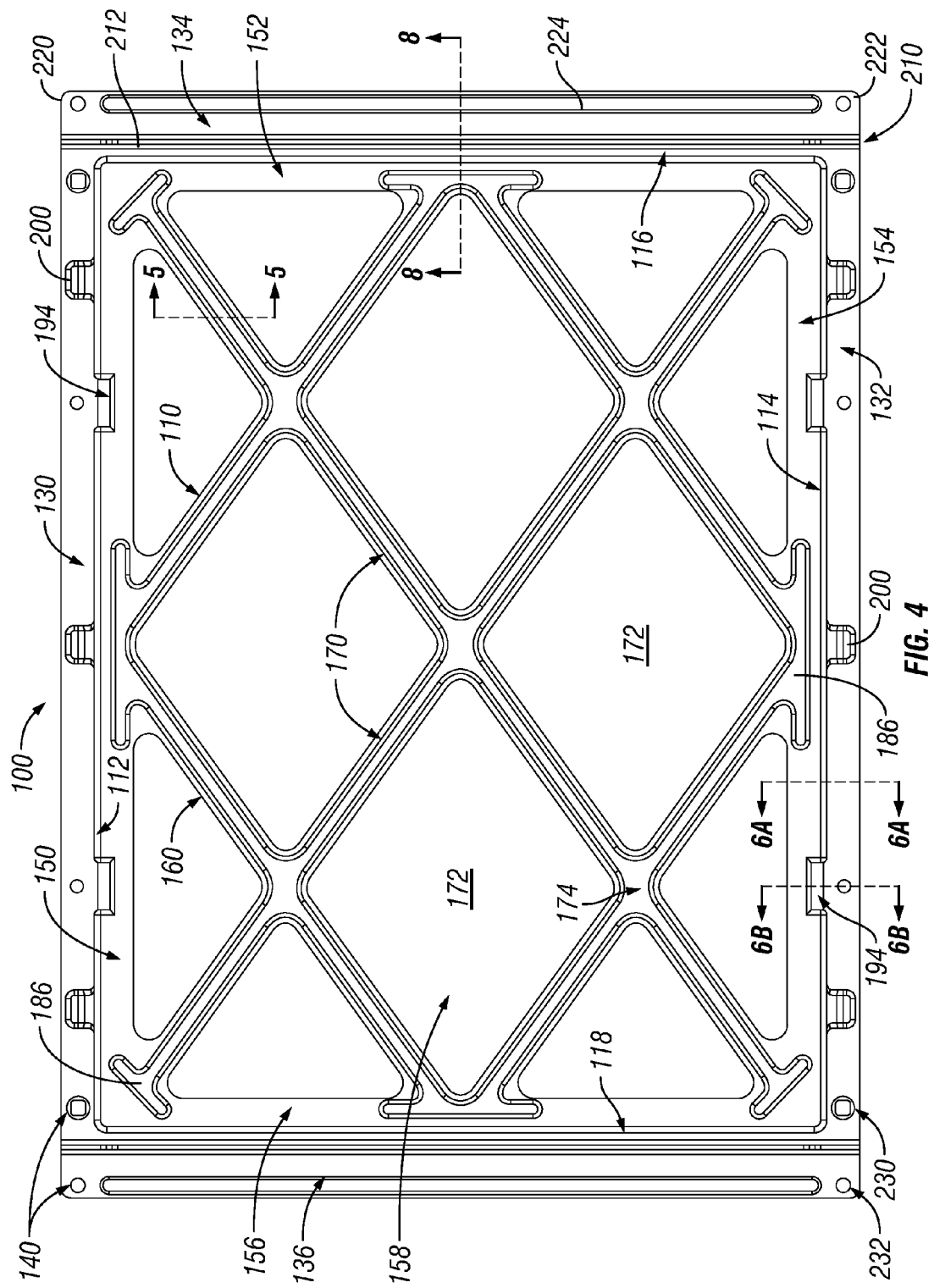
FIG. 4 is a top plan view of the frame assembly of FIG. 3.
Figure 5:
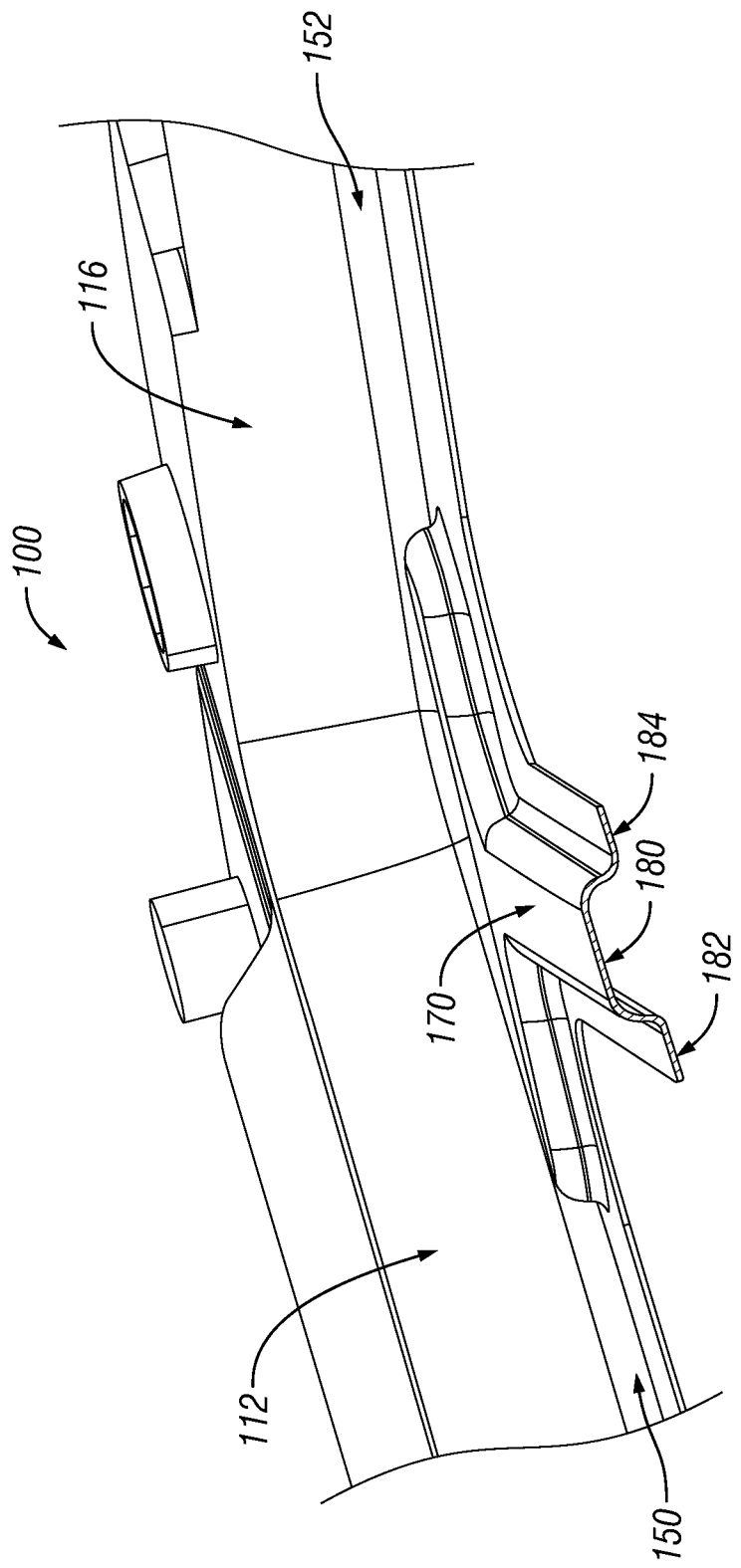
FIG. 5 is an enlarged, perspective, cross-sectional view of a portion of the frame assembly of FIG. 4, taken along the line 5-5.

With additional reference to FIG. 4, the base 110 is configured to receive and support an air filter in the presence of air flow, and includes or defines first-fourth edge panels 150-156. The edge panels 150-156 are contiguous with one another, forming a perimeter of the base 110. An air flow region 158 is collectively defined or circumscribed by the edge panels 150-156. As a point of reference, when an air filter (not shown) is mounted to the frame assembly 100 and the frame assembly 100 installed within an HVAC system, air flow through the air filter occurs at openings in the air flow region 158. The base 110 further includes a grid 160 extending from and between the edge panels 150-156, across the air flow region 158. The grid 160 can be configured to provide support for the loaded air filter, enhanced structural rigidity of the frame assembly 100, etc. The grid 160 can assume a wide variety of shapes and constructions that may or may not be directly implicated by the views. In some embodiments, however, the grid 160 includes a plurality of ribs or struts 170. The ribs 170 can extend in various directions from and between respective ones of the edge panels 150-156. With the optional pattern of the grid 160 as shown, selective ones of the ribs 170 extend in different directions to create various air flow openings 172, and are intermittently connected to one other at various points of intersection 174. The points of intersection 174 between the ribs 170 enhance the structural rigidity of the frame assembly 100. In addition or alternatively, the ribs 170 can have a non-planar cross-sectional shape that further enhances rigidity. For example, FIG. 5 illustrates an optional cross-sectional shape of one of the ribs 170 in greater detail. The rib 170 is shaped to include or define a central region 180 and opposing legs 182, 184. The legs 182, 184 are co-planar, and in some embodiments are co-planar with the edge panels 150-156 (FIG. 4). The central region 180 projects from the plane of the legs 182, 184, with a curvature of the rib 170 along the central region 180 and in transitioning from the central region 180 to the legs 182, 184 rendering the rib 170 more structurally robust and rigid to torsional forces (akin to a channel beam). The channel beam (or similar) shape can be imparted into segments of the edge panels 150-156, for example as identified at 186 in FIGS. 3 and 4, to further enhance a structural rigidity of the frame assembly 100. Other shapes are also envisioned. In other embodiments, the ribs 170 can be entirely planar and/or need not intersect one another. Similarly, the edge panels 150-156 can assume other shapes, and in other embodiments can be entirely planar.

Returning to FIGS. 3 and 4 the first side wall 112 projects from the first edge panel 150 and the second side wall 114 projects from the third edge panel 154. The side walls 112, 114 can be identical, with a portion of the second side wall 114 shown in greater detail in FIG. 6A. The second side wall 114 is primarily defined by a side wall panel 190, with extension of the side wall panel 190 (e.g., a major plane of the side wall panel 190) establishing a nesting angle A relative to a major plane of the third edge panel 154 that promotes nesting between two frame assemblies 100 (i.e., a first frame assembly 100 stacked into a second frame assembly 100). The nesting angle A can be on the order of 91°-120°, alternatively in the range of about 92°-100°. With additional reference to FIGS. 3 and 4, the nesting angle A is similarly established by the first side wall 112 relative to the first edge panel 150, as well as between the end walls 116, 118 relative to the corresponding edge panels 152, 156 as described below.

Figure 6A:
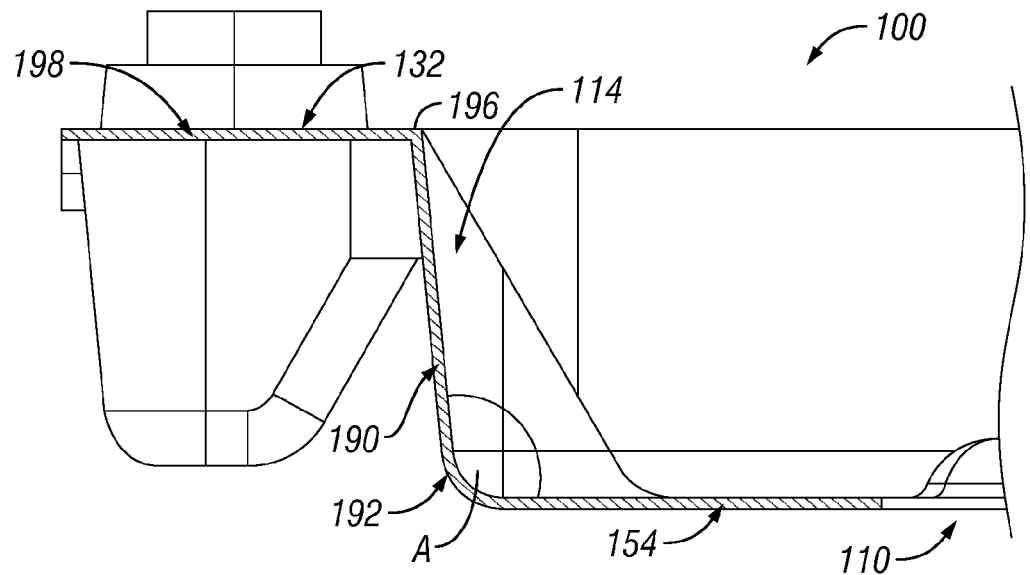
FIG. 6A is an enlarged, cross-sectional view of a portion of the frame assembly of FIG. 4, taken along the line 6A-6A.

FIG. 6A reflects that a curved corner 192 can be formed along at least a majority of the intersection between the second side wall 114 and the third edge panel 154. In other embodiments, the corner 192 can have a more distinct construction or angle. Apart from the curved corner 192, at least a majority of the second side wall 114 (e.g., the side wall panel 190) can be substantially planar in extension between the base 110 and the second support flange 132. Optional structural support features can be generated in or along the side walls 112, 114 that represent a departure from the otherwise substantially planar geometry of the side wall panel 190 and serve to reinforce the side walls 112, 114 relative to the base 110. For example, FIGS. 3 and 4 illustrate one or more shoulders 194 defined along each of the side walls 112, 114 as extension from the corresponding edge panels 150, 154. While two of the shoulders 194 are shown along each of the side walls 112, 114, any other number, greater or lesser, is also acceptable. The shoulders 194 are generally formed as inward projections from the major plane of the corresponding side wall panel 190. One of the shoulders 194 along the second side wall 114 is shown in greater detail in FIG. 6B. The shoulder 194 extends between the third edge panel 154 and the second support flange 132 at an angle differing from that established along the side wall panel 190 such that the shoulder 194 reinforces the second side wall 114 relative to the third edge panel 154, impeding deflection of the second side wall 114. The shoulders 194 can assume a wide variety of forms and in other embodiments can be omitted.

Figure 6B:
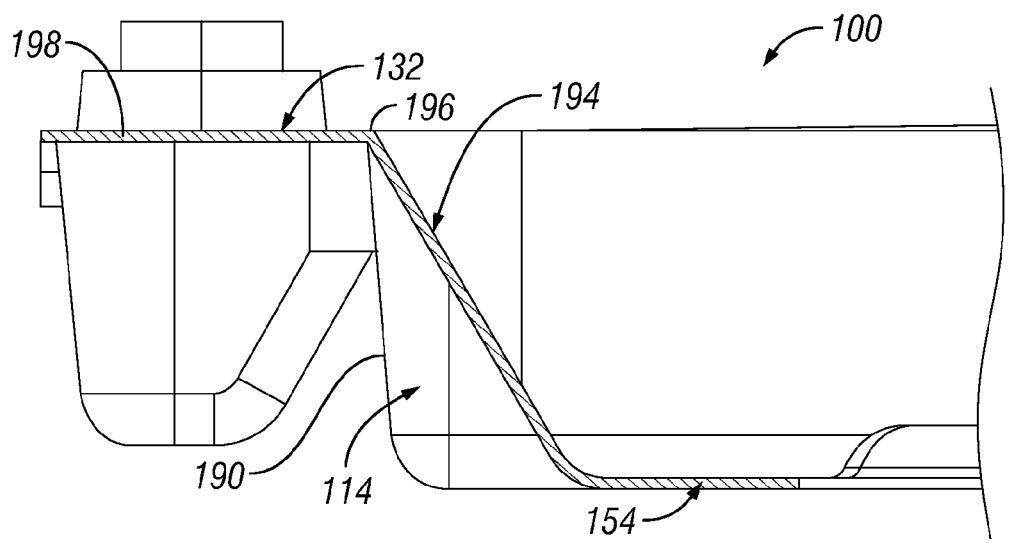
FIG. 6B is an enlarged, cross-sectional view of a portion of the frame assembly of FIG. 4, taken along the line 6B-6B.

FIGS. 6A and 6B further reflect projection of the second support flange 132 relative to the second side wall 114. The first support flange 130 (FIG. 3) can have an identical construction. As shown, a relatively sharp corner 196 can be established at an intersection between the second side wall 114 and the second support flange 132, and a major plane of the second support flange 132 as established by a panel 198 portion of the support flange 132 is substantially parallel (e.g., within 5 degrees of a truly parallel relationship) with the major plane of the third edge panel 154. A wall thickness of the frame assembly 100 along the corresponding edge panel 154, side wall 114, corner 196, and support flange 132 can be substantially uniform and combines with a geometry of the sharp corner 196 to resist overt deflection of the second support flange 132 relative to the second side wall 114. As generally implicated by FIGS. 3 and 4, a similar relationship is established by the first support flange 130 relative to the first side wall 112 and the first edge panel 150.

Figure 7A:
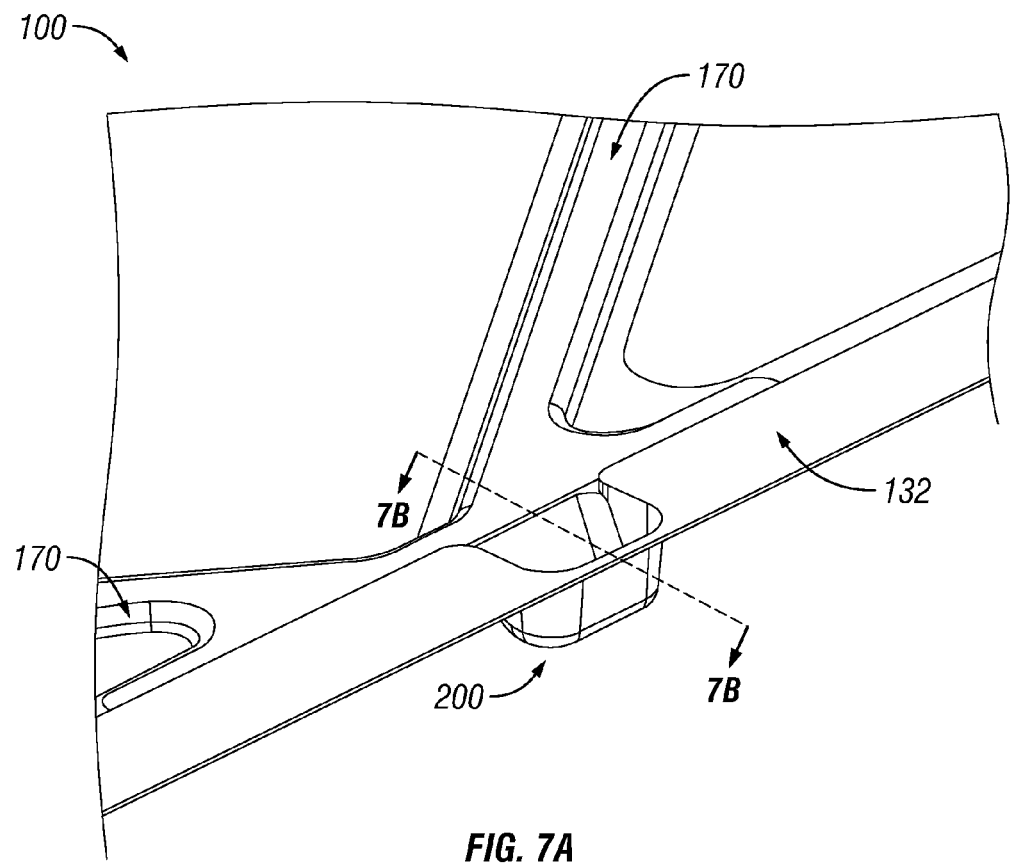
FIG. 7A is an enlarged, perspective view of a portion of the frame assembly of FIG. 3.
Figure 7B:
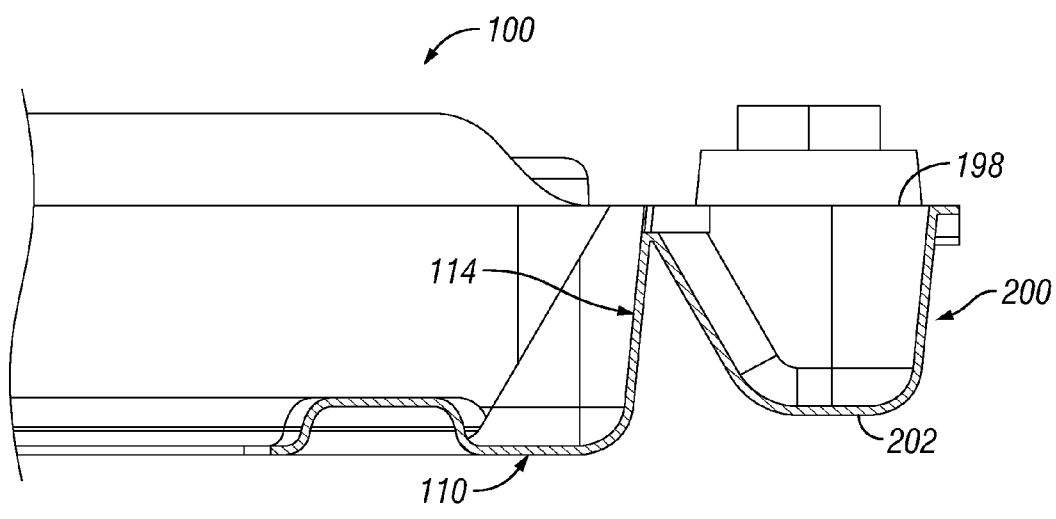
FIG. 7B is an enlarged, cross-sectional view of a portion of the frame assembly of FIG. 7A, taken along the line 7B-7B.

As described below, one or more components of the closure features 140 are defined or formed along the support flanges 130, 132. Other surface features or geometries can optionally be incorporated into one or both of the support flanges 130, 132. For example, one or more feet or lugs 200 can be formed along a length of one or both of the support flanges 130, 132, characterized as downward (i.e., in a direction of the base 110) projections from the major plane or panel 198 of the side flange 130, 132. The feet 200, where provided, are configured to support the frame assembly 100 when stacked on to a second frame assembly 100, and can assume a variety of geometries. One possible format of one of the feet 200 is shown in greater detail in FIGS. 7A and 7B. Regardless of exact form, a bottom face 202 of the foot 200 is longitudinally above (in the height direction) the major plane of the base 110 and is longitudinally below the flange panel 198.

Figure 8:
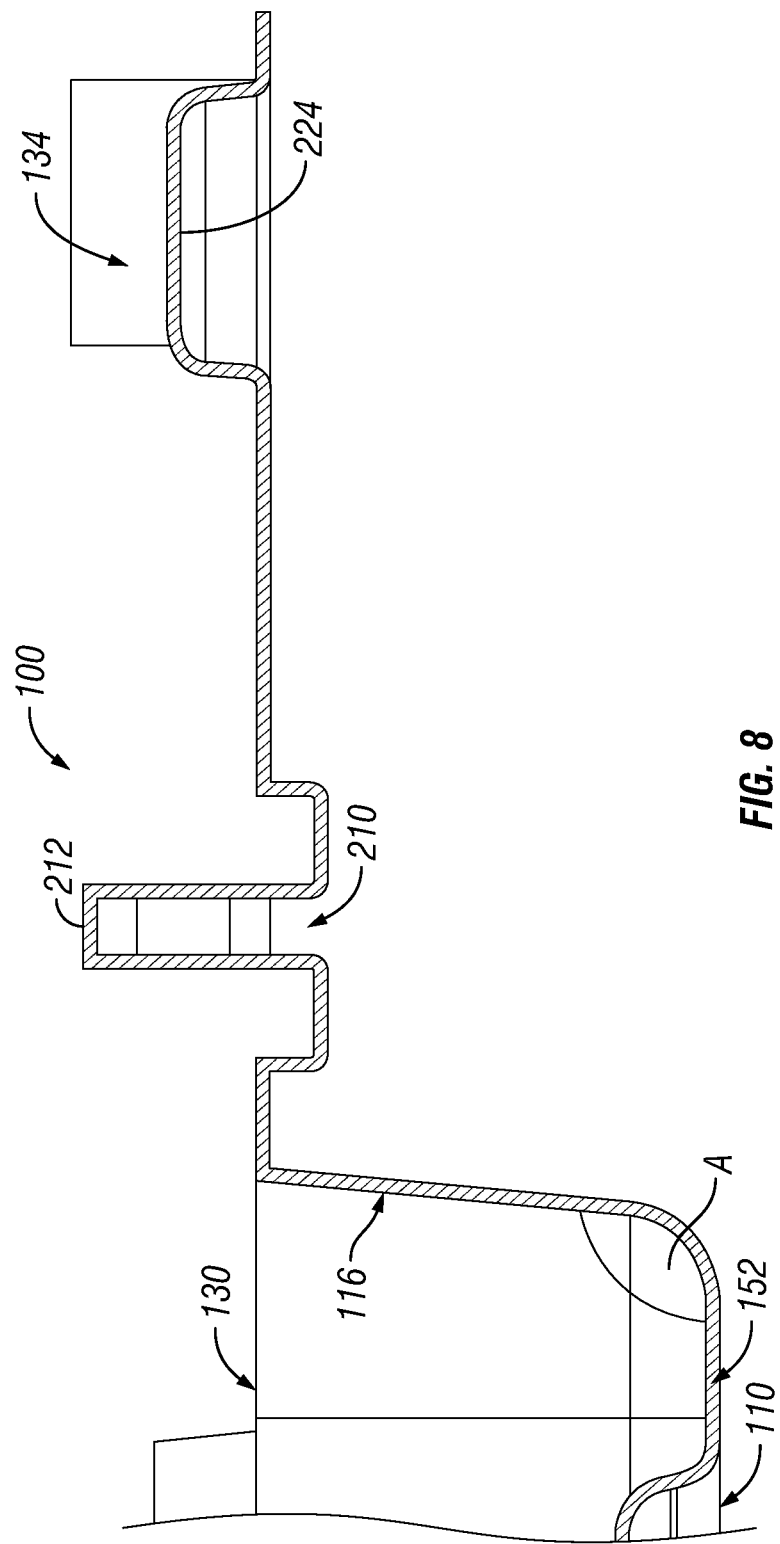
FIG. 8 is an enlarged, cross-sectional view of a portion of the frame assembly of FIG. 4, taken along the line 8-8.

Returning to FIGS. 3 and 4, the end walls 116, 118 can be identical, as can the relationship of each end wall 116, 118 relative to the corresponding base edge panel 152, 156. FIG. 8 illustrates the first end wall 116 in greater detail, and reflects that an orientation of the first end wall 116 relative to the second edge panel 152 establishes the nesting angle A described above.

The first capture arm 134 is also shown in FIG. 8, and is connected to the first end wall 116 by a flexible structure, for example a living hinge 210. Formation of the living hinge 210 in connection with plastic thermoforming is known to those of ordinary skill in the art, and can assume various configurations that promote user-prompted pivoting of the first capture arm 134 relative to the first end wall 116 (and thus relative to the support flanges, including the first support flange 130 visible in FIG. 8) from the open arrangement shown to the closed arrangement in which the first capture arm 134 overlies the base 110, projecting inwardly relative to the first end wall 116. The living hinge 210 can form or include one or more bends combining to define a central deflection region 212 at which the living hinge 210 readily pivots. The central deflection region 212 can have an enlarged shape (e.g., height) along a majority of a length of the corresponding capture arm 134, 136; as shown in FIGS. 3 and 4, a height of the central deflection region 212 can be less pronounced adjacent the closure sub-assemblies 140 so as to not interfere with connection of the sub-assemblies 140 as described below. The living hinge 210 can assume a number of other forms that may or may not be directly implicated by the illustration of FIG. 8. The present disclosure is in no way limited to the living hinge 210 configuration reflected by FIG. 8 (or other Figures of the present disclosure). Alternatively, the frame assembly 100 can incorporate other pivot or hinge structures or mechanisms that may or may not include the living hinge 210.

In some embodiments each of capture arms 134, 136 spans the entire distance between the opposing support flanges 130, 132. The capture arms 134, 136 each carry a component of a respective one of the closure features 140 at opposite ends thereof (e.g., at opposing, first and second ends 220, 222 identified for the first capture arm 134). As made clear below, the closure sub-assemblies 140 serve to selectively mount the capture arm 134, 136 to the corresponding support flange 130, 132. Thus, in the closed arrangement, the capture arm 134, 136 is directly held or connected to the support flanges 130, 132 at the corresponding opposing ends 220, 222, whereas an intermediate portion of the capture arm 134, 136 (i.e., between the closure sub-assemblies 140) is free of direct connection to the support flanges 130, 132. With this in mind, the capture arms 134, 136 can include various curvatures or other geometry features that, for example, serve to distribute or relieve stress forces generated at the capture arm 134, 136 by the corresponding living hinge 210 when deflected to, and held at, the closed arrangement via the opposing ends 220, 222. The capture arm 134, 136, in turn, will more readily retain a desired level of flatness in the closed arrangement. For example, a trough 224 can be defined along each of the capture arms 134, 136, and represents a protrusion in the height or depth direction from a major plane of the capture arm 134, 136 (with the major plane being established along the opposing ends 220, 222 that otherwise support a component of the closure sub-assembly 140). The trough 224 initiates at a location proximate, but spaced from, each of the ends 220, 222, and has a gradually increasing depth toward a middle of the closure arm 134, 136. The trough 224 can assume other forms, and other stress distribution or relief features can alternatively be provided. In yet other embodiments, the capture arms 134, 136 can be flat or substantially planar.

Figure 9A:
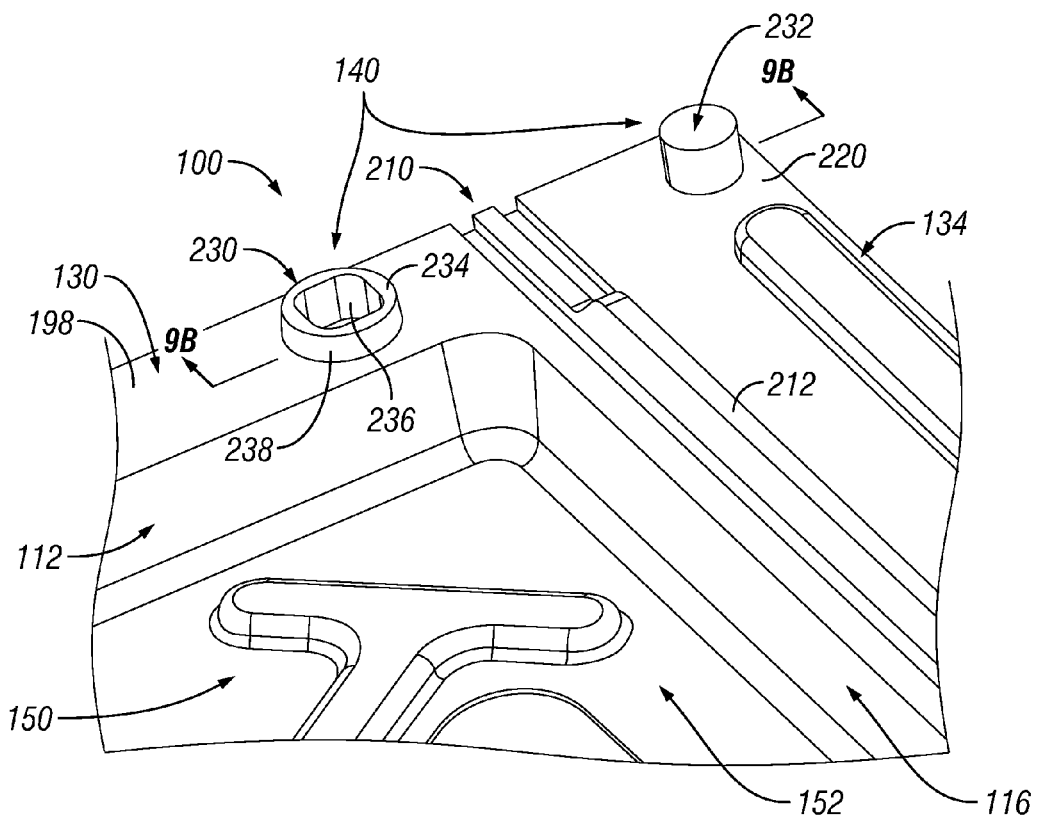
FIG. 9A is an enlarged, perspective view of a portion of the frame assembly of FIG. 3.
Figure 9B:
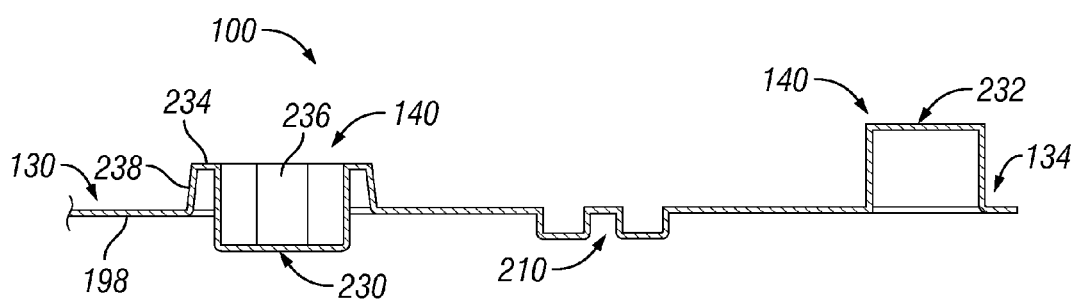
FIG. 9B is an enlarged, cross-sectional view of a portion of the frame assembly of FIG. 9A, taken along the line 9B-9B.

The closure sub-assemblies 140 can be identical, and one exemplary embodiment is shown in greater detail in FIGS. 9A and 9B (at a corner region between the first support flange 130 and the first capture arm 134). The closure sub-assembly 140 includes a receptor 230 and a button or pin 232. The receptor 230 is formed or carried by the support flange 130, projecting upwardly (relative to the orientation of FIGS. 9A and 9B) from the flange panel 198 to a top face 234. The receptor 230 is a generally cylindrical body, and defines a cavity 236 and an outer face 238. The cavity 236 is open at the top face 234, and is dimensioned in accordance with the button 232, configured to receive and frictionally retain the button 232. The outer face 238 is configured to receive or otherwise interface with a corresponding feature (e.g., hole) provided with the air filter (not shown), and can be circular in transverse cross-section. As described below, the air filter is inserted on to or over the receptor 230, engaging the outer face 238. To promote ease of assembly, the outer face 238 optionally tapers in diameter from the flange panel 198 to the top face 234. A number of other constructions are also acceptable.

The button 232 is formed or carried by the capture arm 134 adjacent the first end 220. In the open arrangement of FIGS. 9A and 9B, the button 232 projects upwardly from the major plane of the capture arm 134 and is thus oriented so as to interface with the receptor 230 as the capture arm 134 is pivoted toward the support flange 130 at the living hinge 210. As mentioned above, the button 232 is sized and shaped to be frictionally captured within the cavity 236.

Figure 10A:
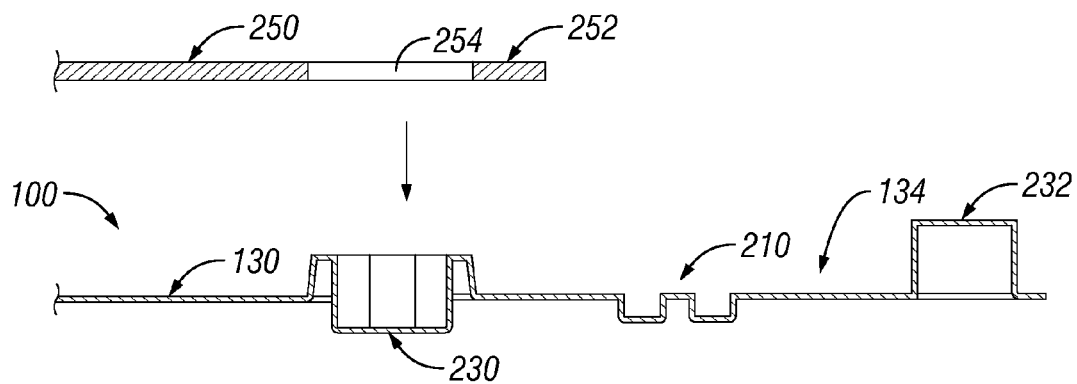
FIGS. 10A-10D illustrate use of the frame assembly of FIG. 3 in releasably receiving an air filter.
Figure 10B:
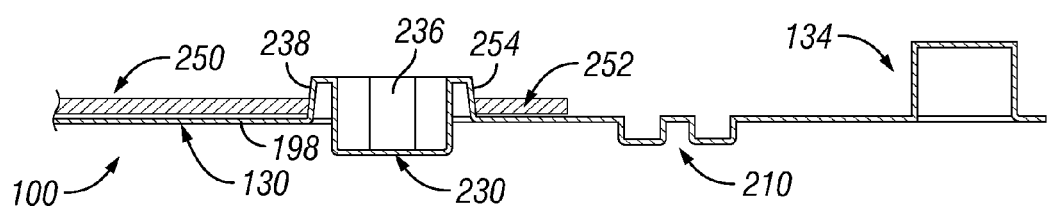
Figure 10C:
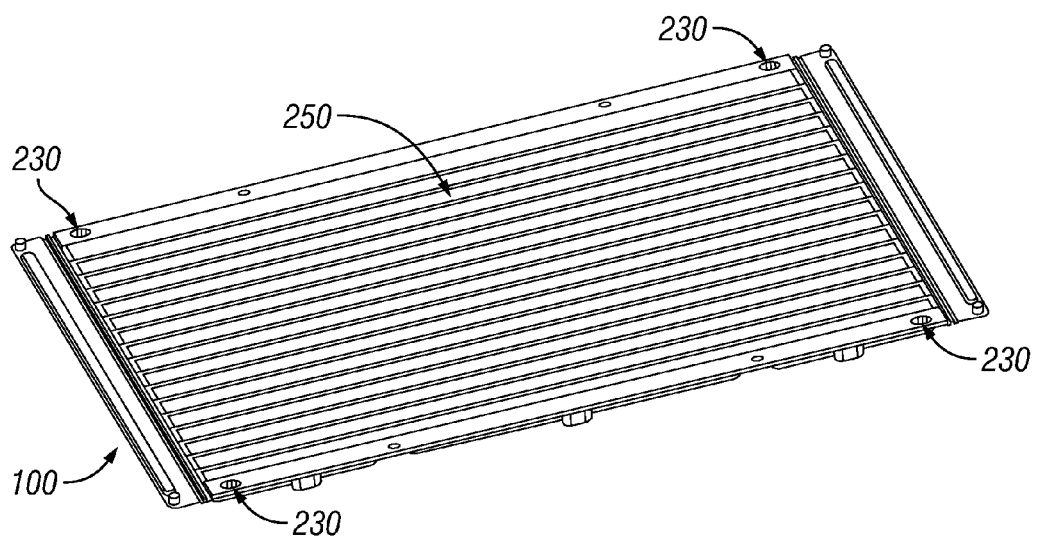

User mounting of an air filter to the frame assembly 100 at one of the closure sub-assemblies 140 is generally reflected in FIGS. 10A-10D. In FIG. 10A, the frame assembly 100 is in the open arrangement, with the capture arm 134 displaced from the support flange 130 such that the button 232 is free from the receptor 230. An air filter 250 is provided, and includes a filter media (not shown) having any of the forms described above and an end member 252 forming a passage 254. The air filter 250 is arranged relative to frame assembly 100 such that the passage 254 is generally aligned with the receptor 230. The air filter 250 is then directed on to frame assembly 100, with the receptor 230 being inserted into the passage 254 as in FIG. 10B. Upon final placement, the air filter 250 rests against the flange panel 198 of the support flange 130, and the outer face 238 generally engages or contacts the air filter 250 within the passage 254. As shown, a height of the receptor 230 is greater than an expected thickness the air filter end member 252. A similar relationship is established between the air filter 250 and the frame assembly 100 at each of the four receptors 230 as reflected by FIG. 10C.

Figure 10D:
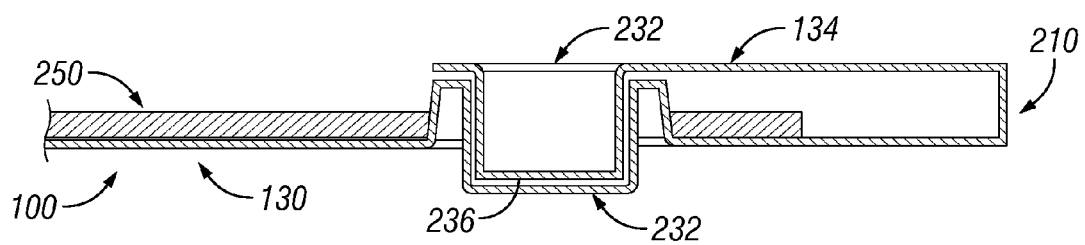

The capture arm 134 is then articulated relative to the support flange 130, pivoting at the living hinge 210, to the closed arrangement of FIG. 10D. Geometries of the frame assembly 100 are such that as part of this motion, the button 232 is naturally brought into alignment with the cavity 236. The button 232 is pressed into the cavity 236 and remains captured relative thereto via, for example, friction or a press fit. In the arrangement of FIG. 10D, then, the air filter 250 is captured by the frame assembly 100 between the support flange 130 and the capture arm 134, and the capture arm 134 is self-retained relative to the support flange 130. When a user desires to remove the air filter 250, a pulling force is applied to capture arm 134 (in a direction opposite the support flange 130) sufficient to separate the button 232 from the receptor 230 thereby returning the frame assembly 100 to the open arrangement. The air filter 250 can then be removed from the receptor 230.

With additional reference to FIGS. 3 and 4, the above-described connections can be accomplished at four corners of the air filter 250 via the four closure sub-assemblies 140. A number of other closure sub-assembly arrangements and constructions are also envisioned. For example, the receptors 230 can be formed or carried by the capture arms 134, 136 and the buttons 232 formed or carried by the support flanges 130, 132. Alternatively, the closure sub-assemblies 140 can include or incorporate differing structures or mechanisms capable of supporting and releasably retaining an air filter. It has surprisingly been found, however, that the receptor 230/button 232 constructions described above are well-suited to thermoformed manufacture and can be repeatedly opened and closed.

Figure 11:
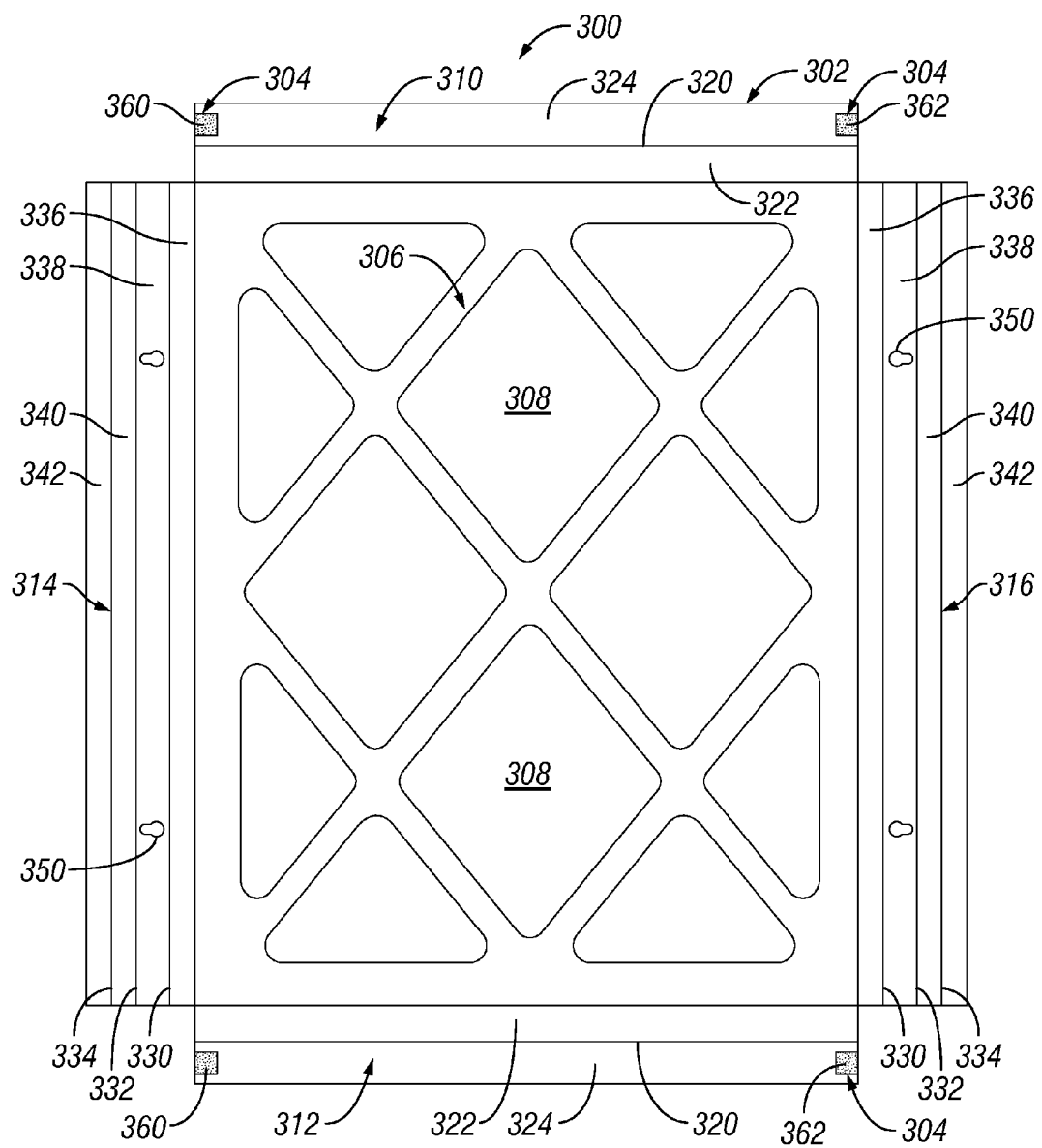
FIG. 11 is a top plan view of another embodiment frame assembly in accordance with principles of the present disclosure and in a flat state.

While the frame assembly 100 has been described as optionally being a thermoformed plastic structure, other materials and methods of manufacture (and/or assembly) are envisioned. For example, FIG. 11 illustrates another embodiment of a frame assembly 300 in accordance with principles of the present disclosure in flat form. The frame assembly 300 generally includes a frame body 302 and closure sub-assemblies 304 (a portion of several of which are generally identified in FIG. 11). The frame body 302 is formed of a paper- or paperboard-based material, or any other sheet material such as plastic film or sheeting, with various fold lines facilitating assembly of the frame body 302 from the flat state of FIG. 11 to an assembled state described below. For example, the frame body 302 is cut to form a grid panel 306 having air passages 308. Opposing, first and second end panels 310, 312 and opposing, first and second side panels 314, 316 extend from the grid panel 306 as shown. A fold line is formed at the intersection of each of the end and side panels 310-316 and the grid panel 306. The end panels 310, 312 can be identical. A fold line 320 is formed in each of the end panels 310, 312, generating first and second end flaps 322, 324 that are readily foldable relative to one another. Fold lines 330-334 are formed in each of the side panels 314, 316, generating first-fourth side flaps 336-342 that are readily folded relative to one another. One or more apertures 350 are formed through a thickness of the second side flap 338 for reasons made clear below.

The closure sub-assemblies 304 are configured to retain the panels 310-316 relative to one another following folding, and generally include complimentary components carried by respective ones of the end panels 310, 312 and the side panels 314, 316. In some embodiments, the closure sub-assemblies 304 include strips of complimentary fastening materials, such as hook-and-loop (e.g., Velcro®), applied to the panels 310-314. For example, FIG. 11 illustrates first and second fastening material strips 360, 362 applied to the second end flap 324 of the end panels 310, 312. The strips 360, 362 can carry or provide small hooks, small loops, or both. Though hidden in the view of FIG. 11, corresponding strips of complimentary fastening material (hooks, loops, or both) are applied to the second side flap 338 of the side panels 314, 316.

Figure 12A:
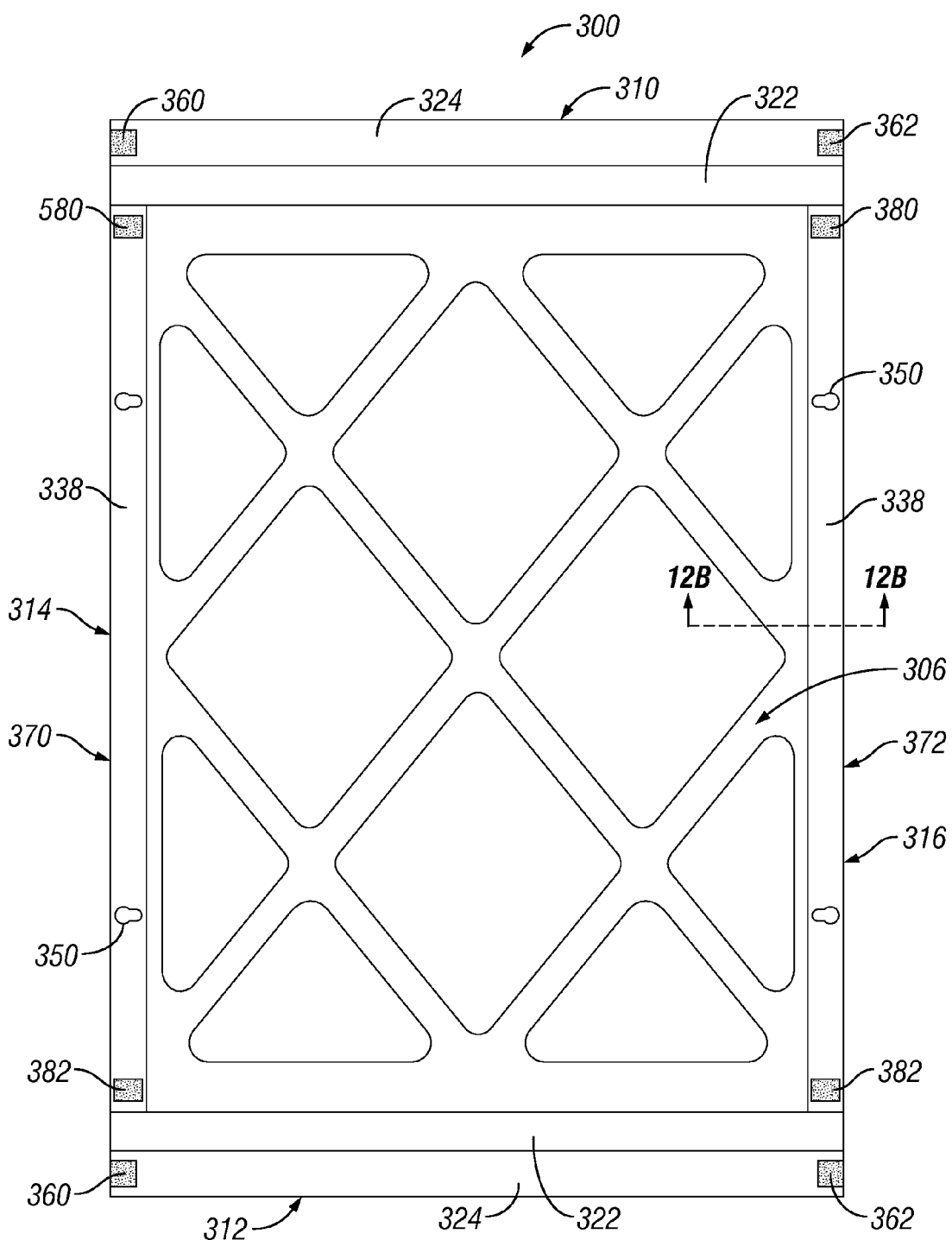
FIG. 12A is a top plan view of the frame assembly of FIG. 11 in a partially folded state.
Figure 12B:
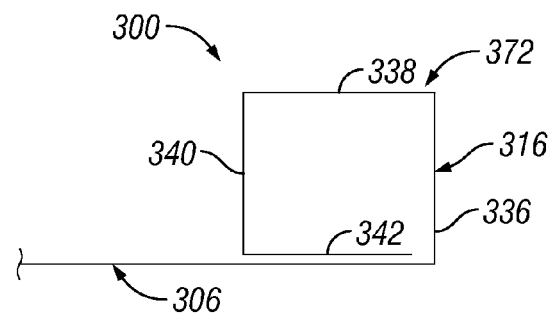
FIG. 12B is a simplified cross-sectional view of a portion of the frame assembly of FIG. 12A, taken along the line 12B-12B.

Assembly of the frame body 302 from the flat state includes folding the side panels 314, 316 along the various fold lines 330-34 (and relative to the grid panel 306) to generate side columns 370, 372 as reflected by FIGS. 12A and 12B. As shown, in the final folded state, the second side flap 338 is located above, and substantially parallel with, the grid panel 306. The apertures 350 are available for receiving a complimentary engagement body provided with an air filter (not shown) otherwise releasably loaded to the frame assembly 300. FIG. 12A further illustrates first and second strips 380, 382 of complimentary fastening material carried by each of the second side flap 338.

The end panels 310, 312 are then transitioned from the flat state to a final, folded state by folding the first end flap 322 relative to the grid panel 306, and folding the second end flap 324 relative to the first end flap 322, bringing the strips of fastening material 360, 362 carried by the second end flap 324 into engagement with a corresponding one of the strips of complimentary fastening material 380, 382 carried by the side panels 314, 316. Once fastened, the folded end panels 310, 312 retain the side panels 314, 316 in the folded form. In other words, in the final state, the frame assembly 300 self-retains the side columns 370, 372 and no adhesive is required. In other embodiments, adhesives or similar materials can be used; for example, an adhesive strip may be used to attach the fourth side flap 342 to the grid panel 306.

Figure 13:
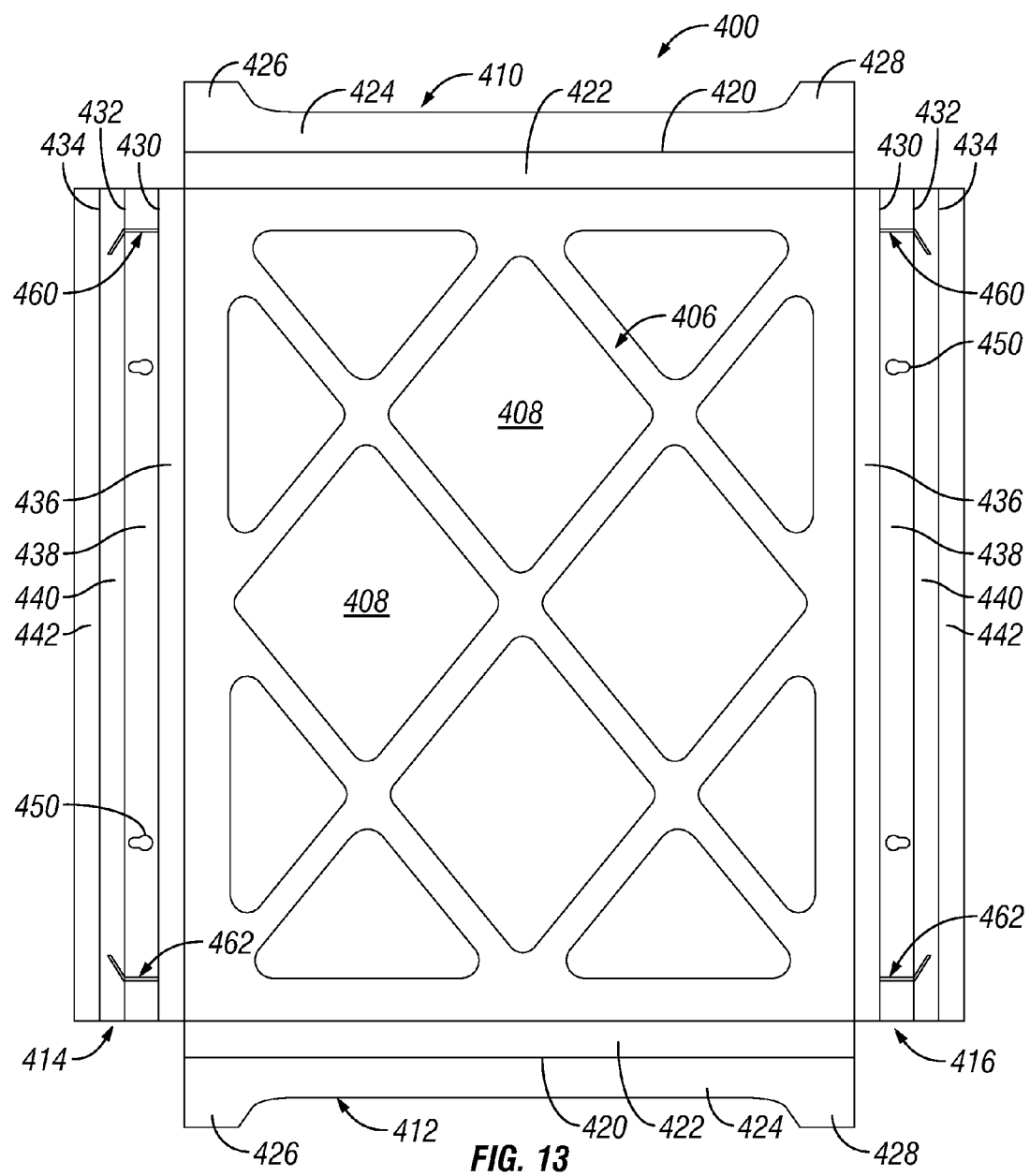
FIG. 13 is a top plan view of another embodiment frame assembly in accordance with principles of the present disclosure and in a flat state.

Another, related embodiment frame body 400 is shown, in a flat state, in FIG. 13. The frame body 400 can be highly akin to the frame body 302 (FIG. 11) described above. However, unlike the frame assembly 300 (FIG. 11), separate fastening material strips are not necessary for maintaining the frame body 400 in the folded state. Thus, the frame body 400 alone can be viewed, in the folded state, as being a frame assembly of the present disclosure.

As with the frame body 302 (FIG. 11), the frame body 400 is formed of a paper- or paperboard-based material, or any other sheet material such as plastic film or sheeting with various fold lines facilitating assembly of the frame body 400 from the flat state of FIG. 13 to an assembled state described below. For example, the material of the frame body 400 is cut to form a grid panel 406 having air passages 408. Opposing, first and second end panels 410, 412 and opposing, first and second side panels 414, 416 extend from the grid panel 406 as shown. A fold line is formed at the intersection of each of the end and side panels 410-416 and the grid panel 406. The end panels 410, 412 can be identical. A fold line 420 is formed in each of the end panels 410, 412, generating first and second end flaps 422, 424 that are readily foldable relative to one another. The second end flaps 424 each form opposing tabs 426, 428. Fold lines 430-434 are formed in each of the side panels 414, 416, generating first-fourth side flaps 436-442 that are readily folded relative to one another. One or more apertures 450 are formed through a thickness of the second side flap 438. Further, opposing insertion slots 460, 462 are formed through a thickness of each of the side panels 414, 416 along the second and third side flaps 438, 440 for reasons made clear below.

Figure 14:
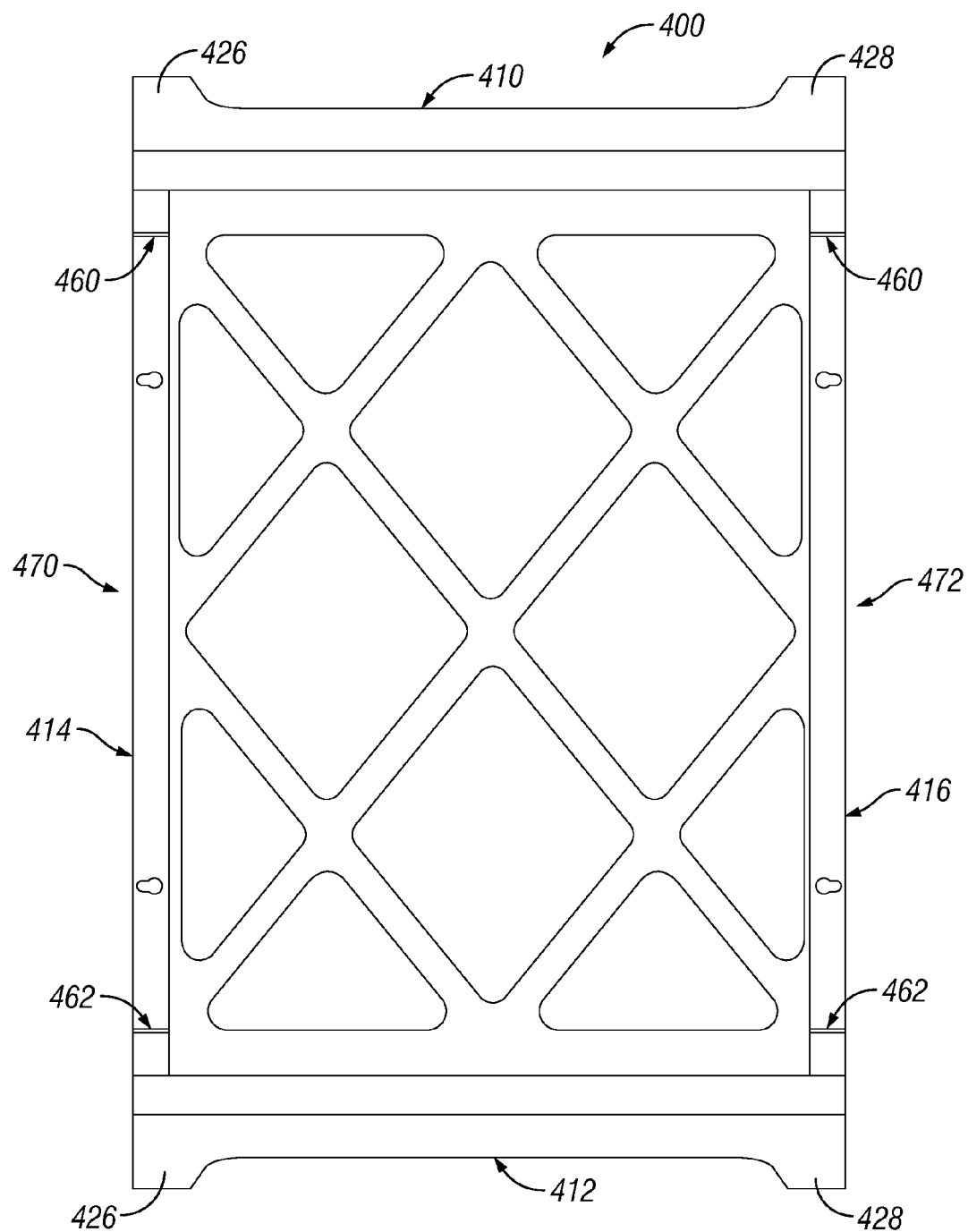
FIG. 14 is a top plan view of the frame assembly of FIG. 13 in a partially folded state.

The side panels 414, 416 are folded relative to the grid panel 406, resulting in side columns 470, 472 as described above and as shown in FIG. 14. In the folded state, the insertion slots 460, 462 (segments of each of which are visible in FIG. 14) are located to receive a corresponding one of the tabs 426, 428 provided with each of the end panels 410, 412. The end panels 410, 412 are then folded as described above, with the tabs 426, 428 being inserted into a corresponding one of the insertion slots 460, 462 (e.g., the first tab 426 of the first end panel 410 is inserted into the first insertion slot 460 of the first side panel 414, etc.). Sufficient engagement (e.g., frictional engagement) is achieved between the tabs 426, 428 and the side panels 414, 416 (at the insertion slots 460, 462) such that the folded end panels 410, 414 retain the side panels 414, 416 in the folded arrangement. Upon completion of the folding process, the frame assembly 400 can be loaded with an air filter (not shown) as described above. The frame body 400 can be shipped, presented to consumers, and/or stored in the flat state, thereby occupying a minimal area; when a user intends to use the frame body 400 for supporting an air filter, the frame body 400 is readily converted by the user to the folded or final state without requiring special tools or adhesives.

Figure 15:
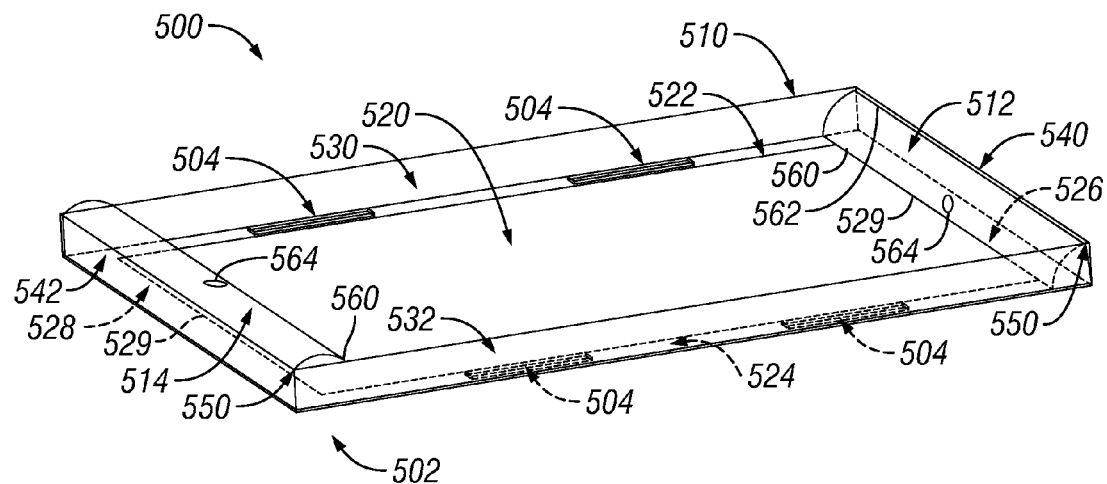
FIG. 15 is a perspective view of another frame assembly in accordance with principles of the present disclosure.

Another embodiment of a frame assembly 500 in accordance with principles of the present disclosure is shown in FIG. 15. The frame assembly 500 includes a frame body 502 and mounting structures 504. In general terms, the frame body 502 is sized and shaped to receive an air filter (not shown). The mounting structures 504 are carried by the frame body 502 and are configured to removably secure the air filter to the frame body 502.

The frame body 502 includes or defines a base frame 510 and opposing, first and second end panels 512, 514. As a point of reference, in the illustration of FIG. 15, the first end panel 512 is shown in a closed position relative to the base frame 510 whereas the second end panel 514 is in an opened position.

Figure 16:
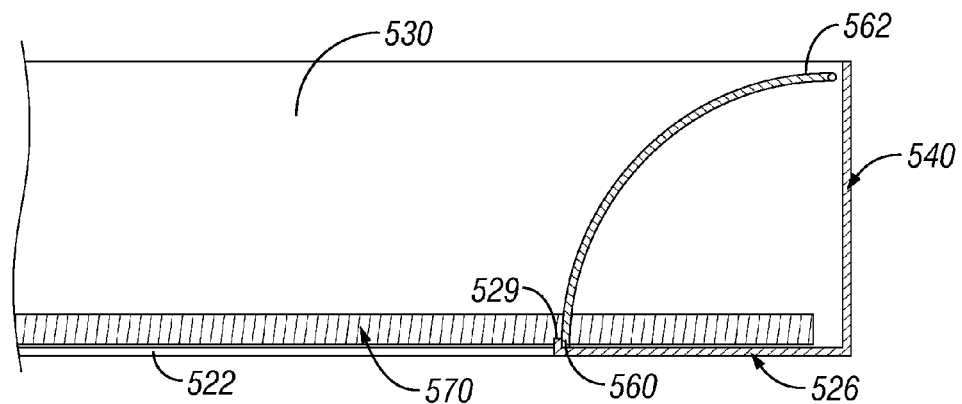
FIG. 16 is an enlarged, cross-sectional view of a portion of the frame assembly loaded with an air filter.

The base frame 510 can be a single piece injection molded frame, a pressed resin construction, formed from other sheet material such as plastic film or sheeting, or a paper- or paper board-based material. The base frame 510 forms or defines an open area 520 that is circumscribed by four contiguous edge members, including opposing first and second side edge members 522, 524 and opposing first and second end edge members 526, 528 (it being understood that in the view of FIG. 15, the first side edge member 522 is visible, whereas the remaining edge members 524-528 are primarily hidden). For reasons made clear below, the end edge members 526, 528 optionally incorporate one or more features configured to interface with a corresponding one of the end panels 512, 514 in the closed position. For example, each of the end edge members 526, 528 can form or define an upwardly-projecting lip 529 (referenced generally in FIG. 15; shown in greater detail in FIG. 16). The lip 529 can assume various forms, and can alternatively be described as a ridge, raised portion, elongated boss, etc.

Opposing, first and second side walls 530, 532 extend from corresponding ones of the edge members 522, 524 (e.g., the first side wall 530 extends from the first side edge member 522); opposing, first and second end walls 540, 542 extend from corresponding ones of the edge members 526, 528 (e.g., the first end wall 540 extends from the first end edge member 526). Projection of the walls 530, 532, 540, 542 relative to the edge members 522-528 can optionally establish the nesting angle as described above in some embodiments.

The end panels 512, 514 are pivotably associated with a corresponding one of the end walls 540, 542. In some embodiments, the end panels 512, 514 are separately formed and subsequently assembled to the base frame 510. For example, the end panels 512, 514 can include or form studs (hidden) that are rotatably captured by a corresponding feature (hidden) in the side walls 530, 532 (e.g., a hole, groove, lip, ridge, raised portion, boss, etc.). FIG. 15 identifies the location of two hinged or pivoting connection points generally at 550. Other hinge-like assembly formats are also acceptable. In yet other embodiments, the end panels 512, 514 can be integrally formed with the base frame 510, with a pivoting relationship established relative to the corresponding end wall 540, 542 by a living hinge. Regardless, the end panels 512, 514 can pivot relative to the corresponding end wall 540, 542 between an opened position (e.g., as shown for the second end panel 514) and a closed position (e.g., as shown for the first end panel 512).

The end panels 512, 514 can have a curved shape as reflected in the view, curving between a leading edge 560 and a trailing edge 562. A size and shape of the end panel 512, 514 corresponds with geometries of the base frame 510 such that in rotating or pivoting from the opened position to the closed position, the leading edge 560 contacts the corresponding lip 529. Due at least in part to the curved shape, the end panel 512, 514 will slightly deflect, allowing the leading edge 560 to slide over the lip 529 with continued rotation toward the closed position, and then lock "behind" the lip 529. As described below, the leading edge 560 serves to capture an end of the air filter (not shown) against the lip 529 in the closed position. In this regard, the leading edge 560 of each of the end panels 512, 514 can be shaped (e.g., serrations, scalloped, etc.) to more aggressively interface with the air filter. The end panels 512, 514 each optionally define a hole or aperture 564 that provides a convenient location for a user's finger when attempting to transition the end panel 512, 514 from the closed position to the opened position. The end panels 512, 514 can assume other forms that may or may not be directly implicated by FIG. 15. For example, the end panels 512, 514 can have a telescoping design to better accommodate differently-sized air filters. In addition or alternatively, the side walls 530, 532 and/or the end walls 540, 542 can have a telescoping design.

The mounting structures 504 are assembled to opposing ones of the edge members 522, 524 and can assume various forms appropriate for temporarily coupling to or with an air filter. For example, in some embodiments the mounting structures 504 are adhesive-backed strips of fastening material (e.g., miniature hooks) that will connect with a material of the air filter when placed into contact with one another. Other configurations are equally acceptable, and in some embodiments the mounting structures 504 are complimentary with mounting features incorporated into the air filter as described above.

The frame assembly 500 can be used in fashions similar to previous embodiments whereby a "used" air filter can be removed from the frame assembly 500 and replaced with a new air filter. The air filter is initially loaded into the frame assembly 500 with the end panels 512, 514 in the opened position. The end panels 512, 514 are then pivoted or forced to the closed position to capture a corresponding end of the air filter. For example, FIG. 16 generally represents the first end panel 512 rotated to the closed position and securing an air filter 570 relative to the lip 529. As a point of clarification, while FIG. 16 reflects the leading edge 560 as having passed through (e.g., punctured) the air filter 570; in many instances, however, the end panel 512 will slightly deflect upon contacting the air filter 570 when being forced toward the closed position, pinching a mass of the air filter 570 between the leading edge 560 and the lip 529 upon attaining the closed position. In the closed position, the end panel 512 is effectively locked or held via geometries of the curved shape relative to a resistance the lip 529 effectively exerts against the leading edge 560 (either directly or through a mass of the air filter 570). Where the air filter 570 includes a pleated media, the leading edge 560 may crush the pleats as it engages the media.

The air filter systems of the present disclosure provide a marked improvement over previous designs. In some embodiments, one or both of the air filters and the frame assemblies can be collapsed (apart from one another) to save shelf-space and transportation space. The collapsed filter can be easily expanded and assembled to its usable form, making it easy for end-users to use the air filter. In some embodiments, the frame assemblies are designed to be stackable or nestable, providing additional space savings during transport and retail display. Further, unlike conventional adhesive-based air filter-to-frame attachment techniques, the fastening or mechanical capture systems of the present disclosure are resistant to dust and debris. In some embodiments, the frame assemblies of the present disclosure can be completely knocked down flat for delivery to, and presentation at, a retailer. These optional frame assembly constructions do not require a large, expensive tool to make and can be made of the same types of materials (e.g., paperboard, although possibly thicker in caliper) as conventional air filters. The frame assembly (or components thereof) can be die-cut out of a single piece of paperboard, sheet plastic/film, etc., in some embodiments. In other embodiments, the frame assemblies can be integral, thermoformed plastic bodies.

The recitation of all numerical ranges by endpoint is meant to include all numbers subsumed within the range (i.e., the range 1 to 10 includes, for example, 1, 1.5, 3.33, and 10).

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section and not necessarily for describing a sequential or chronological order. It is to be understood that the terms so used are interchangeable under appropriate circumstances and that the embodiments of the invention described herein are capable of operation in other sequences than described or illustrated herein.

The terminology used herein is for the purpose of describing particular embodiments only and is not intended to be limiting of the invention. As used herein, the singular forms "a," "an," and "the," are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top" and "front" or "back" may be used herein to describe one element's relationship to another elements as illustrated in the Figures. It will be understood that relative terms are intended to encompass different orientations of the device in addition to the orientation depicted in the Figures.

Those having skill in the art will appreciate that many changes may be made to the details of the above-described embodiments and implementations without departing from the underlying principles thereof. Further, various modifications and alterations of the present disclosure will become apparent to those skilled in the art without departing from the spirit and scope of the disclosure. The scope of the present disclosure should, therefore, be determined only by the following claims.

What is claimed is:

1. A frame assembly for releasably maintaining air filter media, the frame assembly comprising:
    a thermoformed, plastic, integral body integrally forming a base, opposing side walls, opposing end walls, and at least one closure sub-assembly;
        wherein the frame assembly is configured to releasably retain the air filter media relative to the base via the closure sub-assembly;
        wherein the frame assembly is configured to, when in an open position without any air filter media, nestably receive a second, identically shaped frame assembly that is also in an open position without any air filter media;
    and,
        wherein the frame assembly further includes one or more capture arms extending from each of the opposing end walls and pivotable relative thereto, with the proviso that the opposing side walls do not comprise any capture arm or arms.

2. The frame assembly of claim 1, further including: a support flange extending from each of the opposing side walls.

3. The frame assembly of claim 1, further including a living hinge interconnecting at least one of the capture arms to the corresponding end wall.

4. The frame assembly of claim 1, wherein the closure sub-assembly includes a first component carried by a first support flange and a second component carried by a first capture arm, and further wherein the first and second components have a complimentary construction such that the first and second components can be releasably connected.

5. The frame assembly of claim 4, wherein the first component is a receptor and the second component is a button.

6. The frame assembly of claim 1, wherein a central region of the base comprises one or more support ribs that each comprise a non-planar cross-sectional shape.

7. The frame assembly of claim 1, further including a support flange extending from each of the opposing side walls, and wherein when the capture arms are pivoted to a closed position, a portion of each capture arm extends over a portion of a support flange.

8. The frame assembly of claim 1, further including a support flange extending from each of the opposing side walls, and wherein each support flange comprises a lug that projects downward from a major plane of the support flange, and wherein a bottom face of the lug is positioned above a major plane of the base of the frame assembly.

9. The frame assembly of claim 1, wherein the base of the thermoformed, plastic, integral body comprises first, second, third and fourth edge panels that are contiguous with one another and form a perimeter of the base, and wherein the edge panels each comprise at least one segment that comprises a non-planar cross-sectional shape.

10. The frame assembly of claim 1, wherein each of the two opposing end walls comprises a capture arm extending therefrom and pivotable relative thereto, wherein each capture arm comprises a major plane and further comprises an elongate protrusion that protrudes upwardly above the major plane of the capture arm when the capture arm is in an open position, and wherein each elongate protrusion comprises a long axis that is aligned with a long axis of the capture arm.

11. A framed air filter comprising the frame assembly of claim 1 with an air filter media removably installed in the frame assembly.

12. The framed air filter of claim 11 wherein the filter media has a pleated construction and is configured to transition between collapsed and expanded states.

* * * * *